(12) United States Patent
Pan et al.

(10) Patent No.: US 11,467,894 B2
(45) Date of Patent: Oct. 11, 2022

(54) SCREEN FREEZING PROCESSING METHOD AND TERMINAL

(71) Applicant: HUAWEI TECHNOLOGIES CO., LTD., Shenzhen (CN)

(72) Inventors: Xinglong Pan, Shenzhen (CN); Yu Li, Beijing (CN); Shuai Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/285,574

(22) PCT Filed: Oct. 14, 2019

(86) PCT No.: PCT/CN2019/110914
§ 371 (c)(1),
(2) Date: Apr. 15, 2021

(87) PCT Pub. No.: WO2020/078297
PCT Pub. Date: Apr. 23, 2020

(65) Prior Publication Data
US 2022/0004460 A1 Jan. 6, 2022

(30) Foreign Application Priority Data
Oct. 16, 2018 (CN) .......................... 201811201702.0

(51) Int. Cl.
*G06F 11/07* (2006.01)
(52) U.S. Cl.
CPC ...... *G06F 11/0742* (2013.01); *G06F 11/0793* (2013.01)

(58) Field of Classification Search
CPC . G06F 11/0742; G06F 11/079; G06F 11/0793
See application file for complete search history.

(56) References Cited

U.S. PATENT DOCUMENTS

| | | | |
|---|---|---|---|
| 6,910,159 B2 * | 6/2005 | Phillips | G06F 11/3476 714/39 |
| 8,898,637 B2 * | 11/2014 | Surazski | G06Q 30/016 717/124 |
| 9,436,533 B2 * | 9/2016 | Hermany | G06F 11/0778 |
| 10,394,690 B1 * | 8/2019 | Potter | G06F 8/70 |

(Continued)

FOREIGN PATENT DOCUMENTS

| | | |
|---|---|---|
| CN | 102073545 A | 5/2011 |
| CN | 104461829 A | 3/2015 |

(Continued)

*Primary Examiner* — Joseph R Kudirka
(74) *Attorney, Agent, or Firm* — Rimon PC

(57) ABSTRACT

A screen freezing processing method and a terminal are provided. The method includes: displaying a user interface of an application, and receiving an operation on the user interface, where the operation on the user interface is used to implement a first function; skipping responding to, by the terminal within first duration, the operation on the user interface, and skipping implementing the first function; and after the first duration, responding to, by the terminal, the operation on the user interface, and implementing the first function. This technical solution can automatically restore implementation of the first function, thereby improving user experience.

11 Claims, 26 Drawing Sheets

(56) References Cited

U.S. PATENT DOCUMENTS

| 2005/0091611 | A1 | 4/2005 | Colleran et al. |
| 2010/0023798 | A1 | 1/2010 | Meijer et al. |
| 2011/0239226 | A1 | 9/2011 | Placanica |

FOREIGN PATENT DOCUMENTS

| CN | 104503912 | A | 4/2015 |
| CN | 105068866 | A | 11/2015 |
| CN | 106959908 | A | 7/2017 |
| CN | 107132974 | A | 9/2017 |
| CN | 107133143 | A | 9/2017 |
| CN | 107590057 | A | 1/2018 |
| CN | 107704132 | A | 2/2018 |
| CN | 107704133 | A | 2/2018 |
| CN | 107704363 | A | 2/2018 |
| CN | 107861817 | A | 3/2018 |
| CN | 107908493 | A | 4/2018 |
| CN | 107943573 | A | 4/2018 |

* cited by examiner

SCREEN FREEZING PROCESSING METHOD AND TERMINAL

This application is a U.S. National Stage Filing of PCT Application PCT/CN2019/110914 which claims priority to Chinese Patent Application No. CN 201811201702.0, filed with the China National Intellectual Property Administration on Oct. 16, 2018 and entitled "SCREEN FREEZING PROCESSING METHOD AND TERMINAL", which is incorporated herein by reference in its entirety.

TECHNICAL FIELD

This application relates to the field of terminal technologies, and in particular, to a screen freezing processing method and a terminal.

BACKGROUND

There are a plurality of foreground applications in a terminal, for example, WeChat and QQ. Users can use foreground applications to interact with terminals. Some functions of a foreground application are implemented by calling another application or a system service. For example, a call service function of the QQ application is implemented by calling a call process. In the prior art, if another application or a system service called by a foreground application is blocked, a phenomenon such as screen freezing or a hang may occur in the foreground application. A solution of terminating the foreground application is usually used, resulting in relatively poor user experience.

SUMMARY

Embodiments of this application provide a screen freezing processing method and a terminal, to automatically restore implementation of a first function, thereby improving the user experience.

According to a first aspect, an embodiment of this application provides a screen freezing processing method, including: A terminal displays a user interface of an application. The terminal receives an operation on the user interface, where the operation on the user interface is used to implement a first function. Within a first duration, the terminal does not respond to the operation on the user interface, and does not implement the first function. After the first duration, the terminal responds to the operation on the user interface, and implements the first function.

In this embodiment of this application, if a problem occurs in implementation of the first function, the terminal can automatically restore implementation of the first function. Compared with the prior art in which the application is directly terminated, thus the user experience is improved.

In a possible design, the first duration includes a time point A and a time point B. When the time point A is reached, the terminal obtains a process call chain. The process call chain includes at least a call relationship between an application process and a first function process. The application process is a process corresponding to the application. The first function process is a process that is associated with the application and that is used to implement the first function. When the time point B is reached, it is determined that the terminal still does not respond to the operation on the user interface, and the first function process is terminated or restarted, to restore the first function. Alternatively, when the time point B is reached, it is determined that the terminal responds to the operation on the user interface, and does not terminate or restart the first function process.

In this embodiment of this application, if a first function associated with an application is not implemented, the terminal determines an application process of the application, then obtains a process call chain of the application process, finally determines the first function process based on the process call chain, and terminates or restarts the first function process. Compared with an existing solution, if a first function associated with an application is not implemented, the application is directly terminated, so that user experience can be improved.

In a possible design, that the terminal responds to the operation on the user interface, and implements the first function includes: The terminal displays a first user interface. The first user interface is used to prompt a user that the first function is restored.

In a possible design, that the terminal responds to the operation on the user interface, and implements the first function includes: The terminal displays a second user interface. The second user interface is used to prompt a user that the first function is restored. The terminal receives an operation on the second user interface or the user interface of the application. The terminal responds to the operation on the second user interface or the user interface of the application, and implements the first function.

By using the second user interface, the user may learn whether the current first function is restored, thereby helping the user perform a next operation, and improving user experience.

In a possible design, that within first duration, the terminal does not respond to the operation on the user interface, and does not implement the first function includes: The terminal displays a third user interface. The third user interface is used to remind a user whether to terminate or restart a first function process.

By using the third user interface, the user may autonomously choose whether to terminate or restart the first function process. Compared with the solution in which the terminal automatically terminates or restarts the first function process, this solution can further improve user experience.

In a possible design, the method further includes: The terminal obtains a call stack of the application process and a call stack of the first function process based on the process call chain. The call stack of the application process and the call stack of the first function process are used to analyze a reason why the terminal does not respond to the operation on the user interface of the application.

In this embodiment of this application, when the first function is not implemented, the terminal obtains the call stack of the first function process and the call stack of the application process. Compared with the prior art in which the terminal obtains all call stacks of the terminal when the first function is not implemented, this solution can improve a fault processing rate of the terminal, thereby accelerating a response.

According to a second aspect, an embodiment of this application further provides a screen freezing processing apparatus, including: a display module, configured to display a user interface of an application; a receiving module, configured to receive an operation on the user interface, where the operation on the user interface is used to implement a first function; and a processing module, configured to: within first duration, skip responding to the operation on the user interface, and skip implementing the first function;

and after the first duration, respond to the operation on the user interface, and implement the first function.

In a possible design, the first duration includes a time point A and a time point B. When the time point A is reached, the processing module obtains a process call chain. The process call chain includes at least a call relationship between an application process and a first function process. The application process is a process corresponding to the application. The first function process is a process that is associated with the application and that is used to implement the first function. When the time point B is reached, the processing module still does not respond to the operation on the user interface, and the first function process is terminated or restarted, to restore the first function. Alternatively, when the time point B is reached, the processing module responds to the operation on the user interface, and does not terminate or restart the first function process.

In a possible design, when responding to the operation on the user interface and implementing the first function, the processing module is specifically configured to control, by the processing module, the display module to display a first user interface. The first user interface is used to prompt a user that the first function is restored.

In a possible design, when responding to the operation on the user interface and implementing the first function, the processing module is specifically configured to: control the display module to display a second user interface, where the second user interface is used to prompt a user that the first function is restored; control the receiving module to receive an operation on the second user interface or the user interface of the application; and respond to the operation on the second user interface or the user interface of the application, and implement the first function.

In a possible design, when skipping responding to the operation on the user interface and skipping implementing the first function within the first duration, the processor is specifically configured to control the display module to display a third user interface. The third user interface is used to remind a user whether to terminate or restart the first function process.

In a possible design, the processing module is further configured to obtain a call stack of the application process and a call stack of the first function process based on the process call chain. The call stack of the application process and the call stack of the first function process are used to analyze a reason why the terminal does not respond to the operation on the user interface of the application.

According to a third aspect, an embodiment of this application further provides a terminal, including a display, a memory, and one or more processors. The display is configured to display a user interface of an application. The memory stores one or more computer programs.

The one or more processors are configured to: call the one or more computer programs stored in the memory, to receive an operation on the user interface; within first duration, skip responding to the operation on the user interface, and skip implementing a first function; and after the first duration, respond to the operation on the user interface, and implement the first function. The operation on the user interface is used to implement the first function.

In a possible design, the first duration includes a time point A and a time point B. The processor obtains a process call chain when the time point A is reached. The process call chain includes at least a call relationship between an application process and a first function process. The application process is a process corresponding to the application. The first function process is a process that is associated with the application and that is used to implement the first function. When the time point B is reached, the processor still does not respond to the operation on the user interface, and the first function process is terminated or restarted, to restore the first function. Alternatively, when the time point B is reached, the processor responds to the operation on the user interface, and does not terminate or restart the first function process.

In a possible design, that the processor responds to the operation on the user interface, and implements the first function includes: The processor controls the display to display a first user interface. The first user interface is used to prompt a user that the first function is restored.

In a possible design, that the processor responds to the operation on the user interface, and implements the first function includes: The processor controls the display to display a second user interface. The second user interface is used to prompt a user that the first function is restored. The processor receives an operation on the second user interface or the user interface of the application. The processor responds to the operation on the second user interface or the user interface of the application, and implements the first function.

In a possible design, that within the first duration, the processor does not respond to the operation on the user interface and does not implement the first function includes: The processor controls the display to display a third user interface. The third user interface is used to remind a user whether to terminate or restart the first function process.

In a possible design, the processor is further configured to obtain a call stack of the application process and a call stack of the first function process based on the process call chain. The call stack of the application process and the call stack of the first function process are used to analyze a reason why the terminal does not respond to the operation on the user interface of the application.

According to a fourth aspect, an embodiment of this application provides a chip. The chip is coupled to a memory in a terminal, so that during running, the chip calls a computer program stored in the memory, to implement the method according to any one of the first aspect or the possible designs provided in the first aspect of the embodiments of this application.

According to a fifth aspect, an embodiment of this application provides a computer storage medium. The computer storage medium stores a computer program. When the computer program is run on a terminal, the terminal is started to perform the method according to any one of the first aspect or the possible designs of the first aspect.

According to a sixth aspect, an embodiment of this application provides a computer program product. When the computer program product is run on a terminal, the terminal is started to perform the method according to any one of the first aspect or the possible designs of the first aspect.

In addition, for technical effects of any possible design manner in the second aspect to the sixth aspect, refer to technical effects of different design manners in the first aspect. Details are not described herein again.

BRIEF DESCRIPTION OF DRAWINGS

FIG. 7a-1, FIG. 7a-2, FIG. 7a-3, and FIG. 7a-4 are schematic diagrams of another user interface of WeChat according to an embodiment of this application;

FIG. 7b-1, FIG. 7b-2, FIG. 7b-3, and FIG. 7b-4 are schematic diagrams of another user interface of WeChat according to an embodiment of this application;

DESCRIPTION OF EMBODIMENTS

It should be understood that the embodiments of this application may be applied to a terminal. In this embodiment of this application, the terminal may be an electronic device, for example, a portable electronic device, a mobile phone, a tablet computer, a wearable device (such as a smartwatch) having a wireless communication function, or an in-vehicle device. An example embodiment of a portable electronic device includes but is not limited to a portable electronic device using iOS®, Android®, Microsoft®, or another operating system. The portable electronic device may alternatively be, for example, a laptop computer with a touch-sensitive surface (for example, a touch panel). It should be further understood that in another embodiment of the embodiments of this application, the terminal may alternatively be a desktop computer with a touch-sensitive surface.

Figure 1:
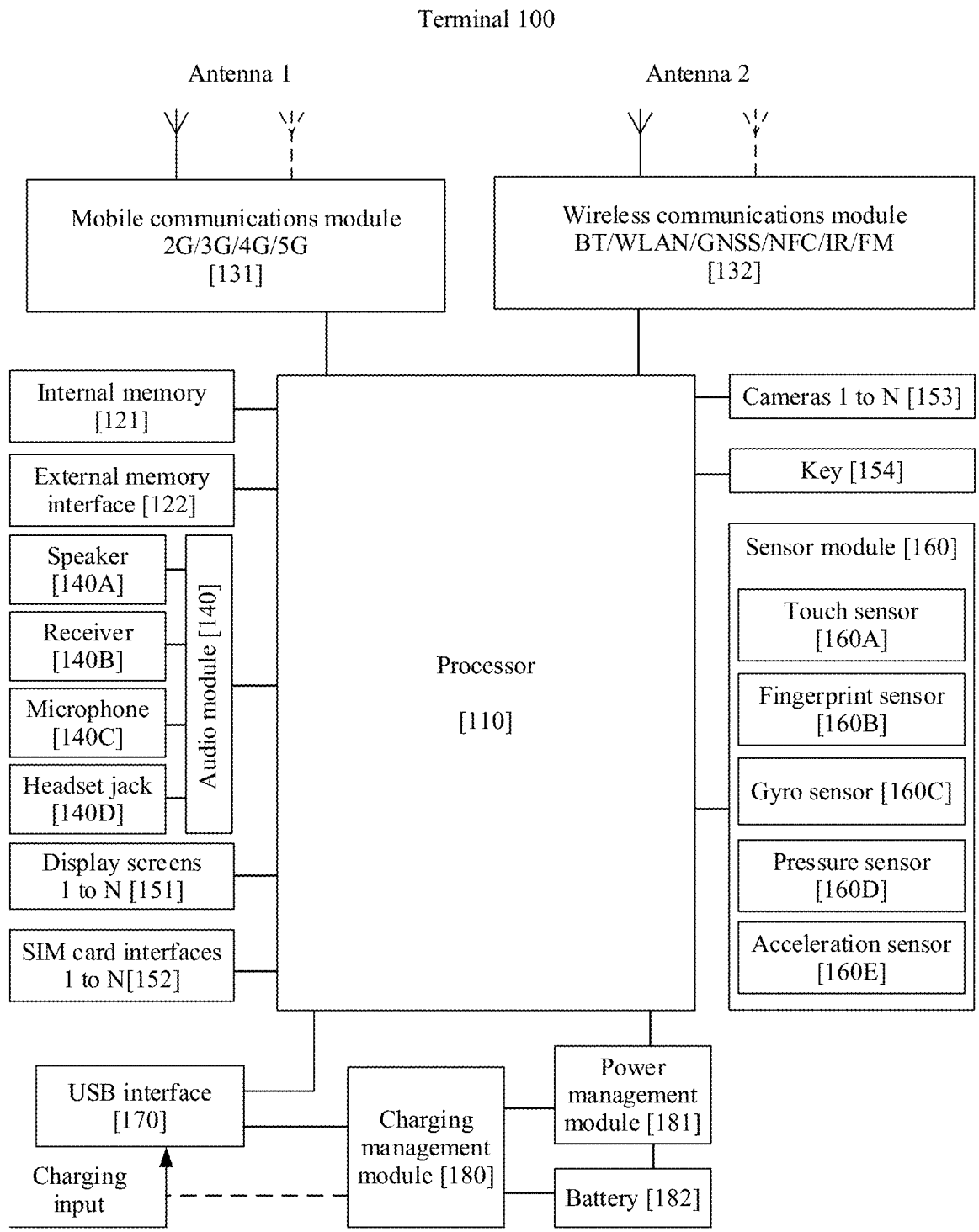
FIG. 1 is a schematic diagram of a hardware structure of a possible electronic device according to an embodiment of this application.

FIG. 1 is a schematic diagram of a hardware structure of a terminal according to an embodiment of this application. Specifically, the terminal 100 may include a processor 110, an internal memory 121, an external memory interface 122, an antenna 1, a mobile communications module 131, an antenna 2, a wireless communications module 132, an audio module 140, a speaker 140A, a receiver 140B, a microphone 140C, a headset jack 140D, and a display screen 151, a subscriber identity module (SIM) card interface 152, a camera 153, a key 154, a sensor module 160, a universal serial bus (USB) interface 170, a charging management module 180, a power management module 181, and a battery 182. In some other embodiments, the terminal 100 may further include a motor, an indicator, and the like.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors.

In some embodiments, a memory may be further disposed in the processor 110, and is configured to store an instruction and data. For example, the memory in the processor 110 may be a cache. The memory may store an instruction or data that has just been used or cyclically used by the processor 110. If the processor 110 needs to use the instruction or the data again, the processor 110 may directly call the instruction or the data from the memory. In this way, repeated access is avoided, a waiting time of the processor 110 is reduced, and system efficiency is improved.

The internal memory 121 may be configured to store computer executable program code, and the executable program code includes an instruction. The processor 110 executes, by running the instruction stored in the internal memory 121, various functional applications and data processing that the electronic device seeks to perform. The internal memory 121 may include a program storage area and a data storage area. The program storage area may store an operating system, an application used by at least one function (such as a sound playing function and an image playing function), and the like. The data storage area may store data (such as audio data, an address book, and a memo) created during use of the terminal 100, and the like. In addition, the internal memory 121 may include a high-speed random access memory, and may further include a non-volatile memory, for example, at least one magnetic disk storage device, a memory device, and a universal flash storage (UFS).

The external memory interface 122 may be configured to connect to an external memory card (for example, a micro SD card), to extend a storage capability of the terminal 100. The external storage card communicates with the processor 110 by using the external memory interface 122, to implement a data storage function. For example, a file such as music or a video is stored in the external storage card.

The antenna 1 and the antenna 2 are configured to transmit and receive an electromagnetic wave signal. Each antenna in the terminal 100 may be configured to cover one or more communications frequency bands. Different antennas may be multiplexed, to improve antenna utilization. For example, the antenna 1 may be multiplexed as a diversity antenna of a wireless local area network. In some other embodiments, the antenna may be used in combination with a tuning switch.

The mobile communications module 131 may provide a solution including 2G/3G/4G/5G and the like that is applied to the terminal 100. The mobile communications module 131 may include at least one filter, a switch, a power amplifier, a low noise amplifier (LNA), and the like. The mobile communications module 131 may receive an electromagnetic wave signal by using the antenna 2, perform processing such as filtering and amplification on the received electromagnetic wave signal, and transmit the electromagnetic wave signal to the modem processor for demodulation. The mobile communications module 131 may further amplify a signal modulated by the modem processor, and convert the signal into an electromagnetic wave signal by using the antenna 1 and radiate the electromagnetic wave signal out. In some embodiments, at least some function modules of the mobile communications module 131 may be disposed in the processor 110. In some embodiments, at least some functions of the mobile communications module 131 and at least some modules of the processor 110 may be disposed in a same component.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (not limited to a speaker 140A, a receiver 140B, or the like), or displays an image or a video by using the display screen 151. In some embodiments, the modem processor may be an independent device. In some other embodiments, the modem processor may be independent of the processor 110, and is disposed in a same component as the mobile communications module 131 or another function module.

The wireless communications module 132 may provide wireless communications solutions applied to the terminal 100, including a wireless local area network (WLAN) such as a Wi-Fi network, Bluetooth (BT), a global navigation satellite system (GNSS), frequency modulation (FM), near field communication (NFC), or infrared (IR). The wireless communications module 132 may be one or more components integrating at least one communications processing module. The wireless communications module 132 receives an electromagnetic wave signal by using the antenna 2, performs frequency modulation and filtering processing on the electromagnetic wave signal, and sends a processed signal to the processor 110. The wireless communications module 132 may further receive a to-be-sent signal from the processor 110, perform frequency modulation and amplification on the to-be-sent signal, convert the to-be-sent signal into an electromagnetic wave signal by using the antenna 2, and radiate the electromagnetic wave signal.

In some embodiments, the antenna 1 is coupled to the mobile communications module 131, and the antenna 2 is coupled to the wireless communications module 132, so that the terminal 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution ((LTE), BT, GNSS, WLAN, NFC, FM, and/or IR technology. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS), or the like.

The terminal 100 may implement an audio function, such as music playing or recording, by using the audio module 140, the speaker 140A, the receiver 140B, the microphone 140C, the headset jack 140D, the application processor, and the like.

The audio module 140 may be configured to convert digital audio information into an analog audio signal for output, and may also be configured to convert an analog audio input into a digital audio signal. The audio module 140 may be further configured to encode and decode an audio signal. In some embodiments, the audio module 140 may be disposed in the processor 110, or some function modules of the audio module 140 are disposed in the processor 110.

The speaker 140A, also referred to as a "horn", is configured to convert an audio electrical signal into a sound signal. The terminal 100 may listen to music or answer a hands-free call by using the speaker 140A.

The receiver 140B, also referred to as an "earpiece", is configured to convert an audio electrical signal into a sound signal. When the terminal 100 answers a call or receives voice information, the receiver 140B may be placed close to a human ear to answer the voice.

The microphone 140C, also referred to as a "microphone" or "microphone", is configured to convert a sound signal into an electrical signal. When making a call or sending voice information, a user may make a sound by placing the microphone 140C close to a mouth. The microphone 140C may be configured to collect voice of the user, and then convert the voice of the user into an electrical signal. At least one microphone 140C may be disposed in the terminal. In some other embodiments, two microphones 140C may be disposed in the terminal 100, and in addition to collecting a sound signal, a noise reduction function may be further implemented. In some other embodiments, three, four, or more microphones 140C may be further disposed in the terminal 100, to collect a sound signal, reduce noise, identify a sound source, implement a directional recording function, and the like.

The headset jack 140D is configured to connect to a wired headset. The headset jack 140D may be the USB interface 170, or may be a 3.5 mm open mobile electronic device platform (OMTP) standard interface, a Cellular Telecommunications Industry Association of the USA (CTIA) standard interface, or the like.

The terminal 100 may implement a display function by using the GPU, the display screen 151, the application processor, and the like. The GPU is a microprocessor for image processing, and is connected to the display screen 151 and the application processor. The GPU is configured to perform mathematical and geometric calculation, and is configured to render a graph. The processor 110 may include one or more GPUs that execute program instructions to generate or change display information.

The display screen 151 may be configured to display an image, a video, and the like. The display screen 151 may include a display panel. The display panel may be a liquid crystal display (LCD), an organic light-emitting diode (OLED), an active-matrix organic light-emitting diode, or an active-matrix organic light-emitting diode (AMOLED), a flexible light-emitting diode (FLED), mini-LED, micro-LED, micro-OLED, quantum dot light-emitting diodes (QLED), and the like. In some embodiments, the terminal 100 may include one or N display screens 151, where N is a positive integer greater than 1.

The terminal 100 may further implement a photographing function by using the ISP, the camera 153, the video codec, the GPU, the display screen 151, the application processor, and the like.

The ISP may be configured to process data fed back by the camera 153. For example, during photographing, a shutter is turned on, light is transmitted to a photosensitive element of the camera through a lens, an optical signal is converted into an electrical signal, and the photosensitive element of the camera transmits the electrical signal to the ISP for processing, to convert the electrical signal into an image visible to naked eyes. The ISP can also optimize noise, luminance, and skin color algorithms of an image. The ISP can also optimize parameters such as exposure and color temperature in a photographing scenario. In some embodiments, the ISP may be disposed in the camera 193.

The camera 153 may be configured to capture a static image or a video. An object is projected to the photosensitive element through an optical image generated by the lens. The photosensitive element may be a charge coupled device (CCD) or a complementary metal-oxide-semiconductor (CMOS) phototransistor. The photosensitive element converts the optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 153, where N is a positive integer greater than 1.

The key 154 may include a power key, a volume key, or the like. The key 154 may be a mechanical key, or may be a touch key. The terminal 100 may receive a key input, and generate a key signal input related to user setting and function control of the terminal 100.

The sensor module 160 may include one or more sensors, for example, a touch sensor 160A, a fingerprint sensor 160B, a gyro sensor 160C, a pressure sensor 160D, and an acceleration sensor 160E. In some embodiments, the sensor module 160 may further include an environmental sensor, a distance sensor, an optical proximity sensor, a bone conduction sensor, or the like.

The touch sensor 160A may also be referred to as a "touch panel". The touch sensor 160A may be disposed on the display screen 151, so that the touch sensor 160A and the display screen 151 form a touchscreen, which may also be referred to as a "touchscreen". The touch sensor 160A is configured to detect a touch operation performed on or near the touch sensor 160A. The touch sensor 160A may transfer the detected touch operation to the application processor, to determine a touch event type. Then, the terminal 100 may provide, by using the display screen 151, a visual output related to the touch operation, or provide, by using the speaker 140A, an audio output related to the touch operation. In some other embodiments, the touch sensor 160A may alternatively be disposed on a surface of the terminal 100, and a location of the touch sensor 160A is different from a location of the display screen 151.

The fingerprint sensor 160 may be configured to collect a fingerprint. The terminal 100 may implement fingerprint unlocking, application access locking, fingerprint photographing, fingerprint-based call answering, or the like by using a feature of the collected fingerprint.

The gyro sensor 160C may be configured to determine a motion posture of the terminal 100. In some embodiments, angular velocities of the terminal 100 around three axes (that is, an x-axis, a y-axis, and a z-axis) may be determined by using the gyro sensor 160C. The gyro sensor 160C may be configured to perform image stabilization during photographing. For example, when the shutter is pressed, the gyro sensor 160C detects an angle at which the terminal 100 shakes, calculates, based on the angle, a distance that needs to be compensated for the lens module, and starts the lens to cancel the shake of the terminal 100 through reverse motion, to implement image stabilization. The gyro sensor 160C may be further used in scenarios such as navigation and motion sensing games.

The pressure sensor 160D is configured to sense a pressure signal, and may convert the pressure signal into an electrical signal. In some embodiments, the pressure sensor 160D may be disposed on the display screen 151. There are many types of pressure sensors 160D, such as a resistive pressure sensor, an inductive pressure sensor, and a capacitive pressure sensor. The capacitive pressure sensor may be a parallel plate including at least two conductive materials. When a force is applied to the pressure sensor 180A, a capacitance between electrodes changes. The terminal 100 determines strength of the pressure based on a change of the capacitance. When a touch operation is applied to the display screen 194, the terminal 100 detects strength of the touch operation based on the pressure sensor 180A. The terminal 100 may also calculate a touch position based on a detection signal of the pressure sensor 180A. In some embodiments, touch operations applied to a same touch position but having different touch operation intensity may correspond to different operation instructions. For example, when a touch operation whose touch operation strength is less than a first pressure threshold is applied to an application icon of a memo, an instruction on viewing the memo is executed. When a touch operation whose touch operation strength is greater than or equal to the first pressure threshold is applied to the application icon of the memo, an instruction on creating a new memo is executed.

The acceleration sensor 160E may detect magnitudes of accelerations of the terminal 100 in various directions (usually three axes). When the terminal 100 is static, a magnitude and a direction of gravity may be detected. The acceleration sensor 160E may be further configured to identify a posture of the terminal 100, or may be applied to an application such as landscape/portrait orientation switching or a pedometer.

In some other embodiments, the processor 110 may further include one or more interfaces. For example, the interface may be the SIM card interface 152. For another example, the interface may alternatively be the USB interface 170. For another example, the interface may alternatively be an inter-integrated circuit (I²C) interface, an inter-integrated circuit sound (I²S) interface, a pulse code modulation (PCM) interface, a universal asynchronous receiver/transmitter (UART) interface, a mobile industry processor interface (MIPI), a general-purpose input/output (GPIO) interface, or the like. It may be understood that in this embodiment of this application, different modules of the terminal 100 may be connected by using interfaces, so that the terminal 100 can implement different functions, such as photographing and processing. It should be noted that a connection manner of using an interface in the terminal 100 is not limited in this embodiment of this application.

The SIM card interface 152 may be configured to connect to a SIM card. The SIM card may be inserted into the SIM card interface 152 or removed from the SIM card interface 152, to implement contact and separation with the terminal 100. The terminal 100 may support one or N SIM card interfaces, where N is a positive integer greater than 1. The SIM card interface 152 may support a nano SIM card, a micro SIM card, a SIM card, and the like. A plurality of cards can be inserted into the same SIM card interface 152 at the same time. The plurality of cards may be of a same type, or may be of different types. The SIM card interface 152 may also be compatible with different types of SIM cards. The SIM card interface 152 may also be compatible with an external storage card. The terminal 100 may interact with a network by using a SIM card, to implement functions such as a call and data communication. In some embodiments, the terminal 100 may use an eSIM, namely, an embedded SIM card. The eSIM card may be embedded in the terminal 100, and cannot be separated from the terminal 100.

The USB interface 170 is an interface that complies with a USB standard specification. For example, the USB interface 170 may include a mini USB interface, a micro USB interface, a USB Type-C interface, or the like. The USB interface 170 may be configured to connect to a charger to charge the terminal 100, or may be configured to transmit data between the terminal 100 and a peripheral device, or may be configured to a headset, to play audio through the headset. The USB interface 170 may alternatively be configured to connect to another electronic device, for example, an augmented reality (AR) device.

The charging management module 180 is configured to receive a charging input from a charger. The charger may be a wireless charger, or may be a wired charger. In some wired charging embodiments, the charging management module 180 may receive a charging input from a wired charger through the USB interface 170. In some wireless charging embodiments, the charging management module 180 may receive a wireless charging input through a wireless charging coil of the terminal 100. When charging the battery 182, the charging management module 180 may further supply power to the terminal 100 by using the power supply management module 181.

The power management module 181 is configured to connect the battery 182, the charging management module 180, and the processor 110. The power management module 181 receives an input of the battery 182 and/or the charging management module 180, and supplies power to the processor 110, the internal memory 121, an external memory, the display screen 151, the camera 153, the mobile communications module 131, the wireless communications module 132, and the like. The power management module 181 may be further configured to monitor parameters such as a battery capacity, a quantity of battery cycle times, and a battery state of health (electric leakage and impedance). In some other embodiments, the power management module 181 may alternatively be disposed in the processor 110. In some other embodiments, the power management module 181 and the charging management module 180 may alternatively be disposed in a same component.

It should be understood that different foreground applications may be installed in the terminal 100 to implement different functions, and a user may interact with the terminal 100 by using the foreground applications. The foreground application may be a native application, for example, settings, a phone, or a camera, or may be a third-party application downloaded from an application store, for example, WeChat or QQ.

It should be understood that the hardware structure of the terminal 100 shown in FIG. 1 is merely an example. The terminal 100 in this embodiment of this application may have more or fewer components than those shown in the figure, may combine two or more components, or may have different component configurations. The various components shown in the figure may be implemented in hardware including one or more signal processing and/or application-specific integrated circuits, software, or a combination of hardware and software.

All the following embodiments may be implemented in a terminal (for example, a mobile phone or a tablet computer) having the foregoing hardware structure.

Figure 2A:
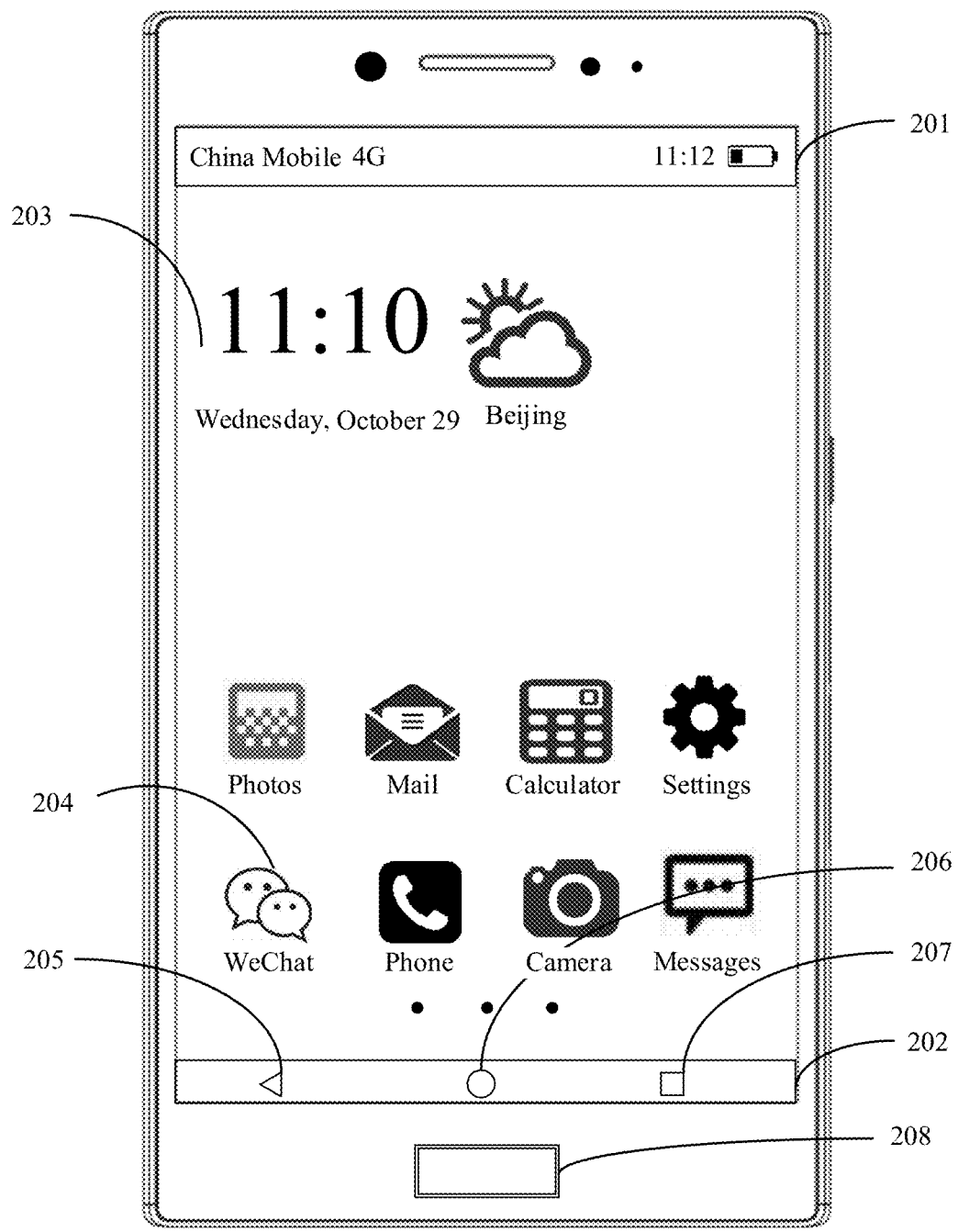
FIG. 2a is a schematic diagram of a home screen according to Embodiment 1 of this application.

For example, FIG. 2a is a schematic diagram of a home screen displayed by the terminal 100 on a touchscreen. The touchscreen may include the touch sensor 160A and the display screen 151. The home screen may include a status bar 201, a navigation bar 202 that can be hidden, a time and weather widget (Widget) 203, and icons of a plurality of applications such as a WeChat icon 204. The status bar 201 may include an operator name (China Mobile), a mobile network identifier (for example, 4G), time, and a remaining battery level. The navigation bar 202 may include a back button 205, a home button 206, and a menu button 207. In some embodiments, the back button may also be referred to as a back button or a back button. The home button may also be referred to as a home screen button. The menu button may also be referred to as a button for viewing a historical task. In addition, it may be understood that in some other embodiments, the status bar 201 may further include a Bluetooth icon, a Wi-Fi icon, an external device icon, and the like. It may be further understood that, in some other embodiments, the home screen shown in FIG. 2a may further include a dock bar. The dock bar may include an icon of a commonly used application, or the like.

Figure 2B:
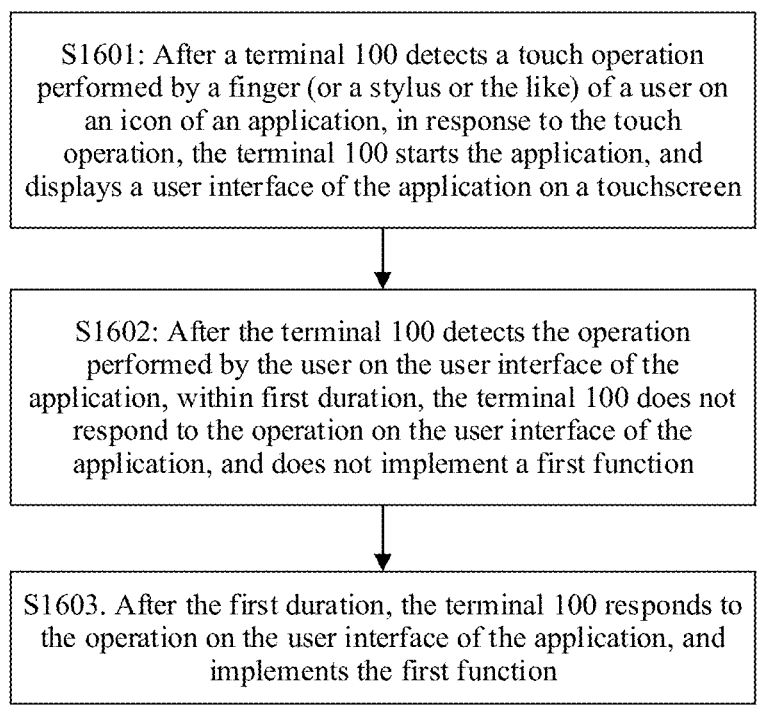
FIG. 2b is a schematic flowchart of a screen freezing processing method according to an embodiment of this application.

As shown in FIG. 2b, an embodiment of this application provides a procedure of a screen freezing processing method. The procedure may include the following steps.

S1601: After the terminal 100 detects a touch operation performed by a finger (or a stylus or the like) of a user on an icon of an application, in response to the touch operation, the terminal 100 starts the application, and displays a user interface of the application on a touchscreen.

S1602: After the terminal 100 detects the operation performed by the user on the user interface of the application, within first duration, the terminal 100 does not respond to the operation on the user interface of the application, and does not implement a first function.

S1603. After the first duration, the terminal 100 responds to the operation on the user interface of the application, and implements the first function. The operation performed by the user on the user interface of the application is used to implement the first function, and may be but is not limited to touching, pressing, or sliding the user interface of the application. The first duration may be but is not limited to 5 seconds, 10 seconds, or the like.

Specifically, the first duration includes a time point A and a time point B. When the time point A is reached, the terminal 100 obtains a process call chain. The process call chain includes at least a call relationship between an application process and a first function process. The application process is a process corresponding to the application. When the time point B is reached, it is determined that the terminal still does not respond to the operation on the user interface, and the first function process is terminated or restarted, restore the first function. Alternatively, when the time point B is reached, it is determined that the terminal responds to the operation on the user interface, and does not terminate or restart the first function process. For example, the time point A may be the $2.5^{th}$ second, and the time point B may be the $5^{th}$ second.

Figure 3:
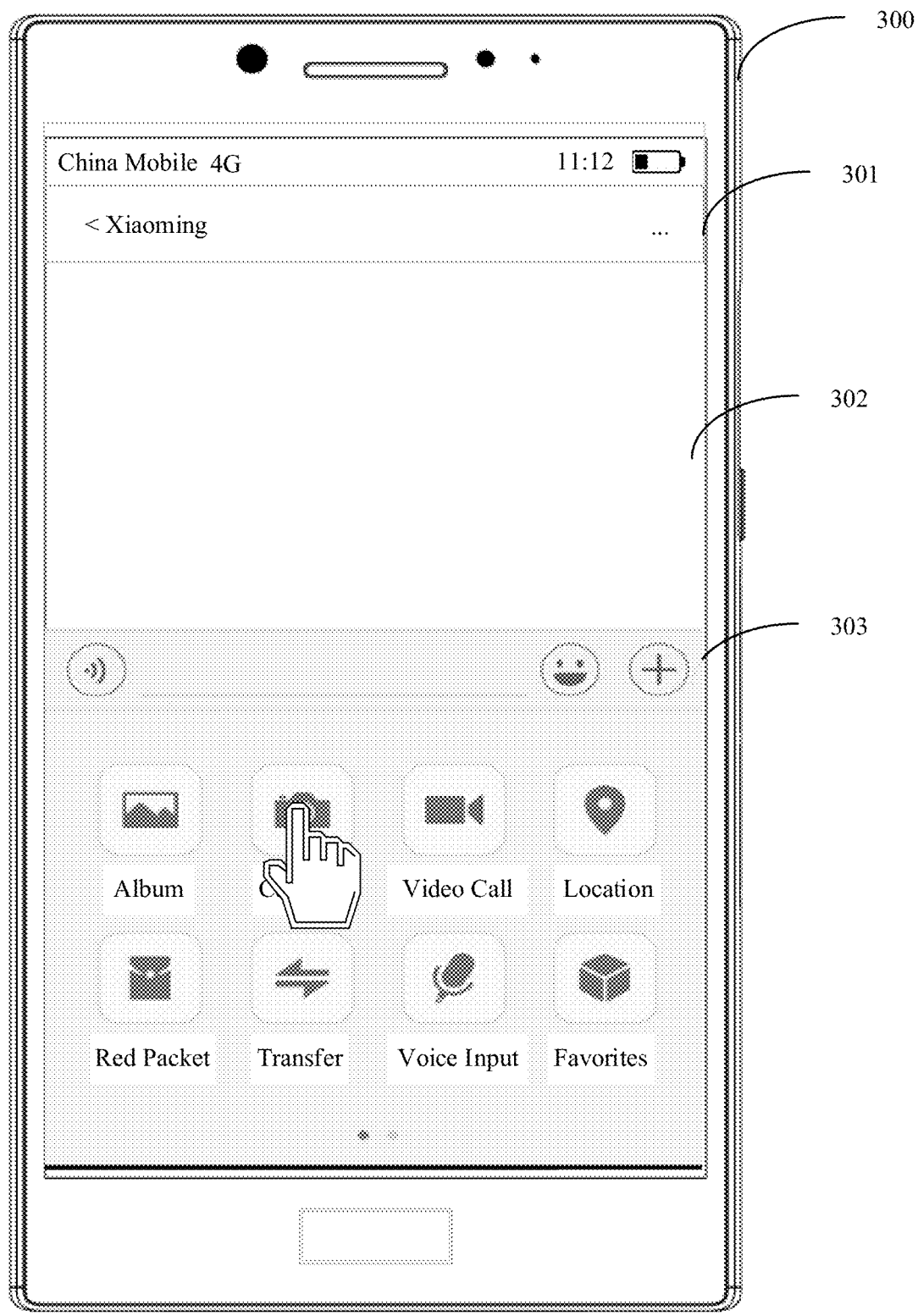
FIG. 3 is a schematic diagram of a user interface of WeChat according to an embodiment of this application.
Figure 4:
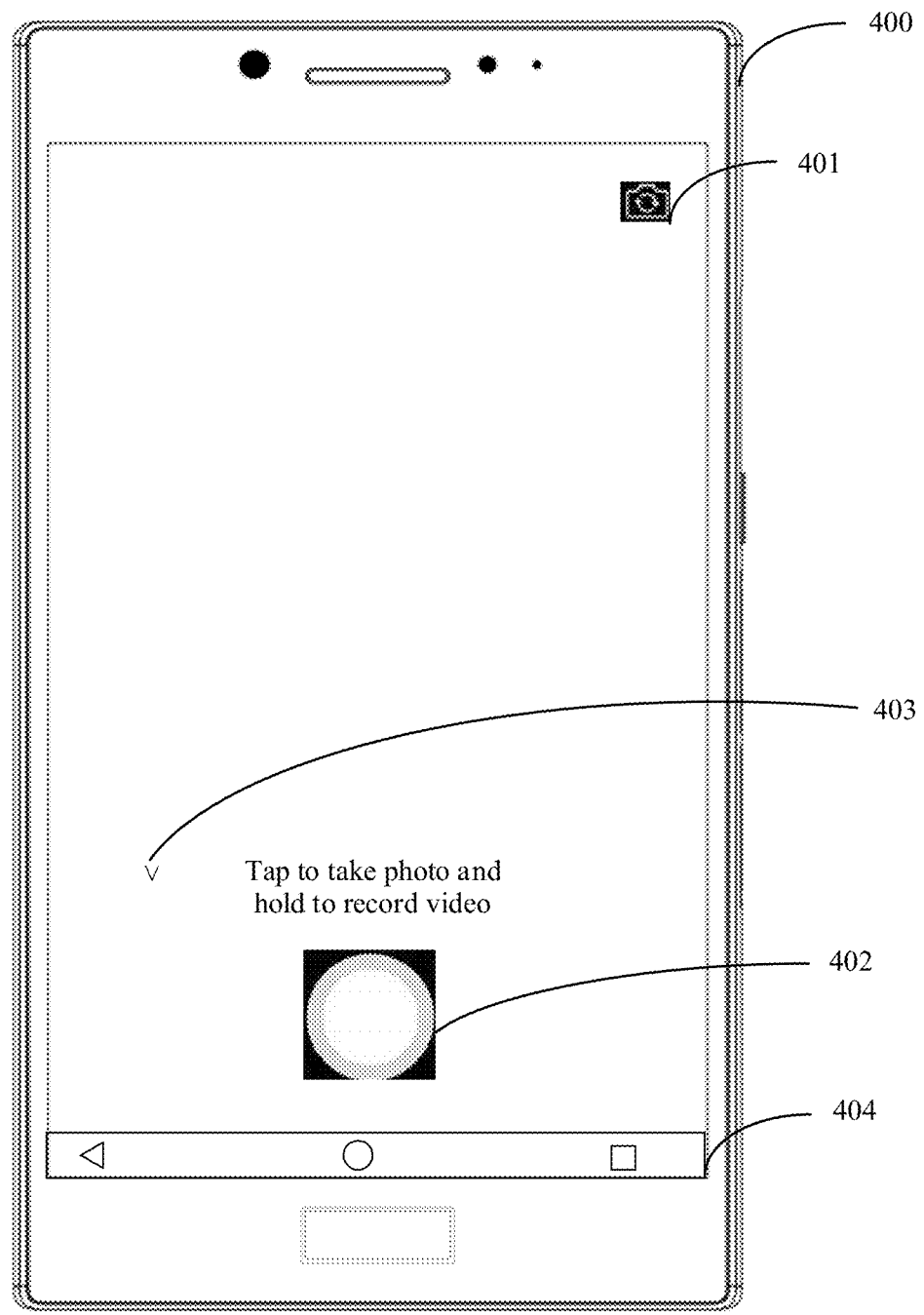
FIG. 4 is a schematic diagram of another user interface of WeChat according to an embodiment of this application.
Figure 5A:
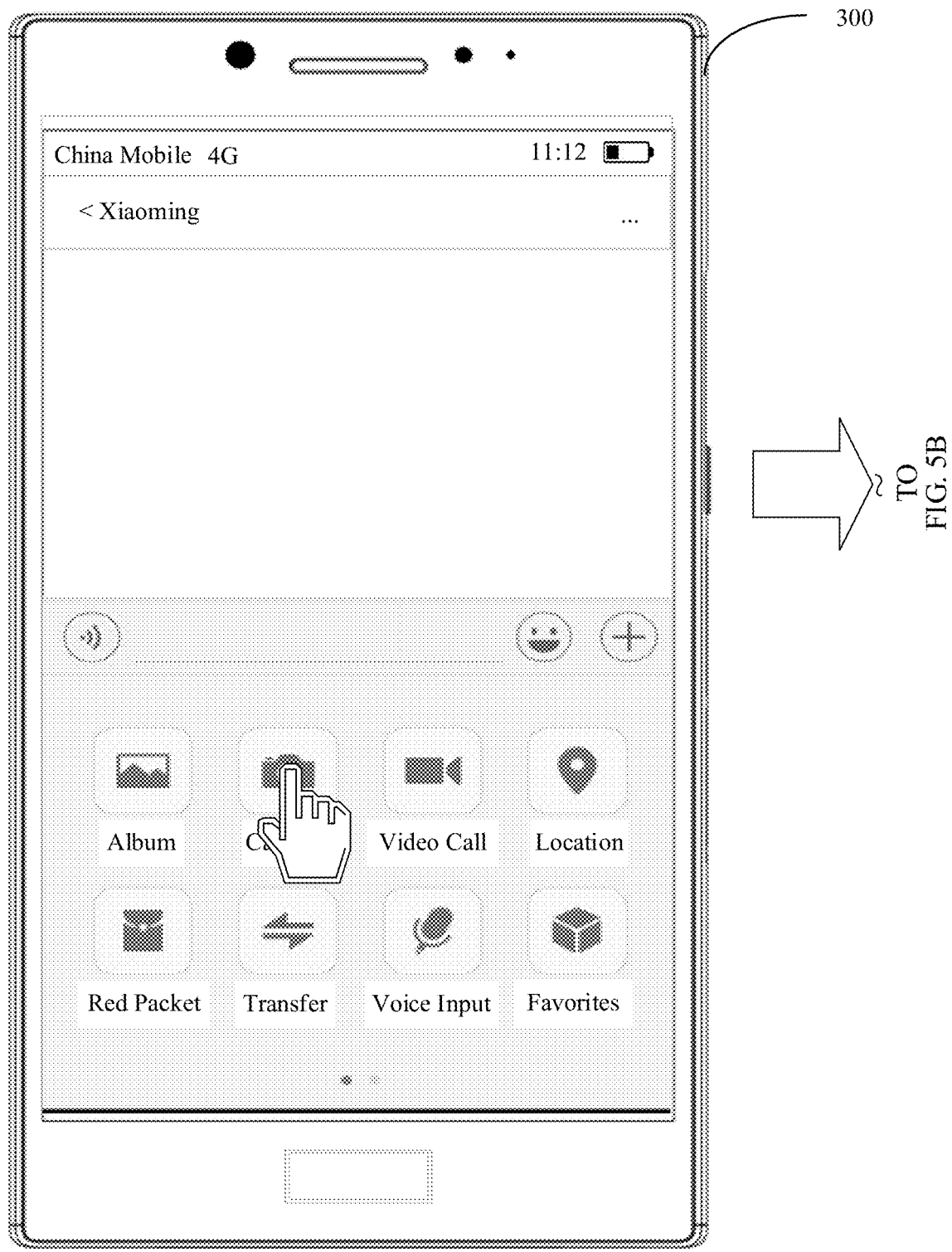
FIG. 5A, FIG. 5B, and FIG. 5C are schematic diagrams of another user interface of WeChat according to an embodiment of this application.
Figure 5B:
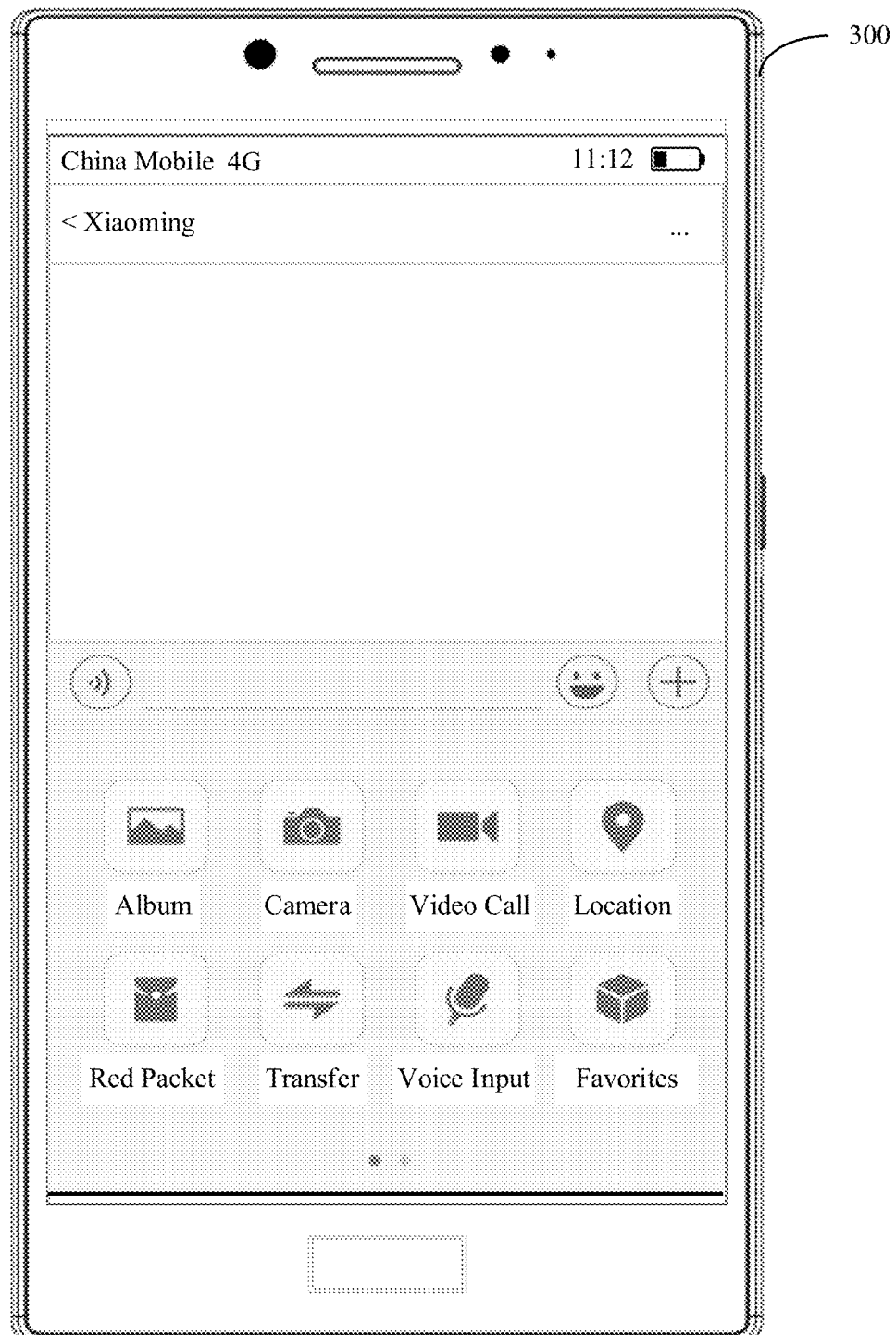
Figure 5C:
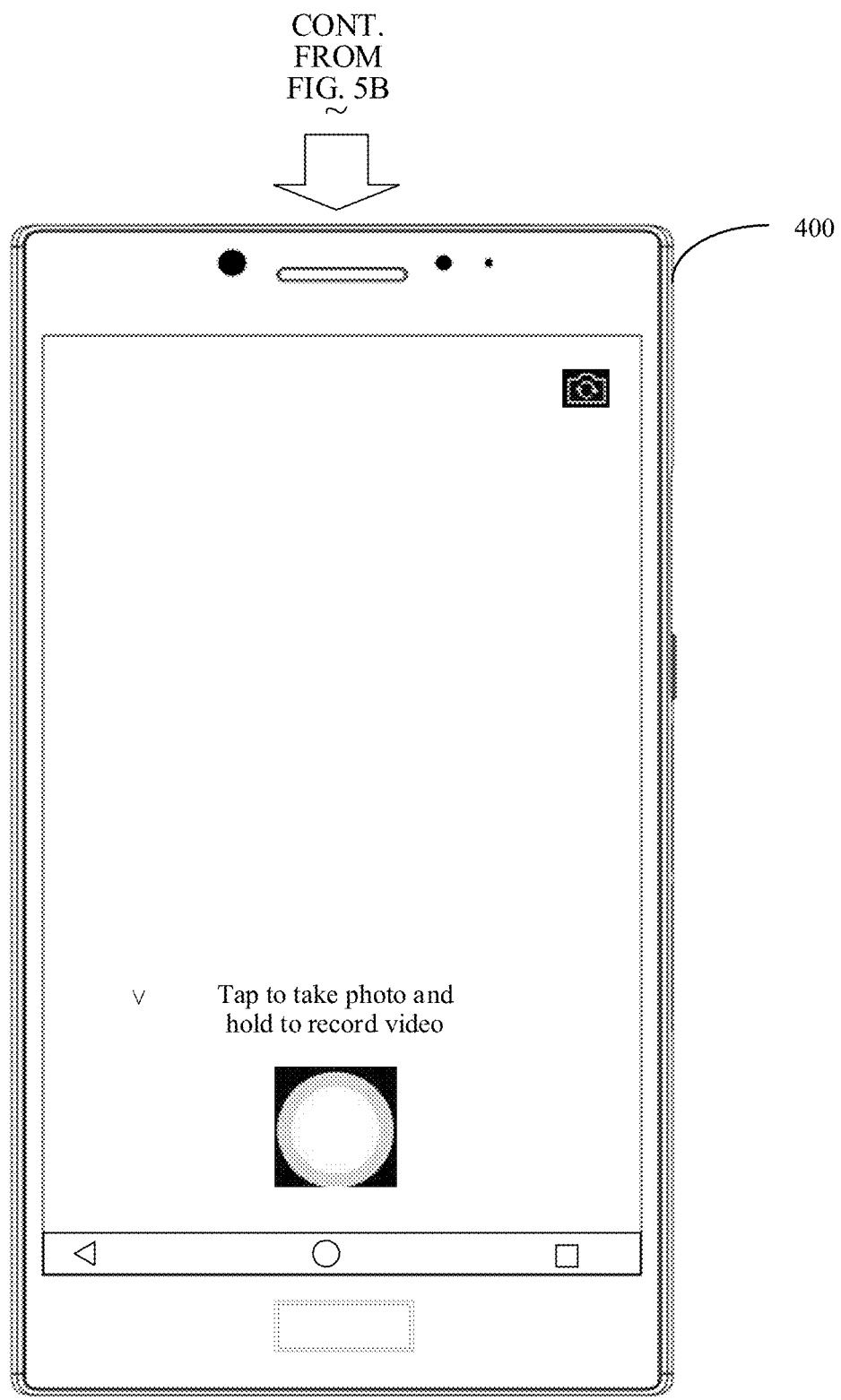

In an example, after the first duration, the terminal may automatically respond to the operation, to implement the first function. A WeChat user interface is used as an example for detailed description. For example, the WeChat user interface may be a user interface 300 shown in FIG. 3. The user interface 300 includes a navigation bar 301, a chat record area 302, a function bar 303, and a plurality of icons. The plurality of icons may include but are not limited to an album icon used to implement album browsing, a photographing icon used to implement a photographing function, a video call icon used to implement a video call/voice call function, and the like. For details, refer to the user interface shown in FIG. 3. Details are not described herein again. The terminal 100 detects a touch operation on the photographing icon, and calls a photographing process. If the photographing process is blocked (also referred to as stalling, a hang, or the like of the photographing process), the terminal 100 may terminate or restart the photographing process, and the touchscreen of the terminal 100 continues to display the user interface 300 shown in FIG. 3. After the first duration (for example, 5 seconds), if the photographing process is restored to normal, the touchscreen of the terminal 100 displays a user interface 400 shown in FIG. 4. The user interface 400 includes an adjustment button 401 for adjusting photographing of a front camera and a rear camera, a suspend button 402 for photographing, a return button 403 for returning to the user interface shown in FIG. 3, and a navigation bar 404. For the navigation bar 404, refer to the description of the navigation bar 202 in FIG. 2*a*. Details are not described herein again. For an entire implementation process of this example, refer to FIG. 5A, FIG. 5B, and FIG. 5C. According to the method in this embodiment of this application, a retention time of a fault (screen freezing) is significantly shortened, and the fault changes from a pop-up prompt to automatic recovery, thereby improving user experience.

Figure 6:
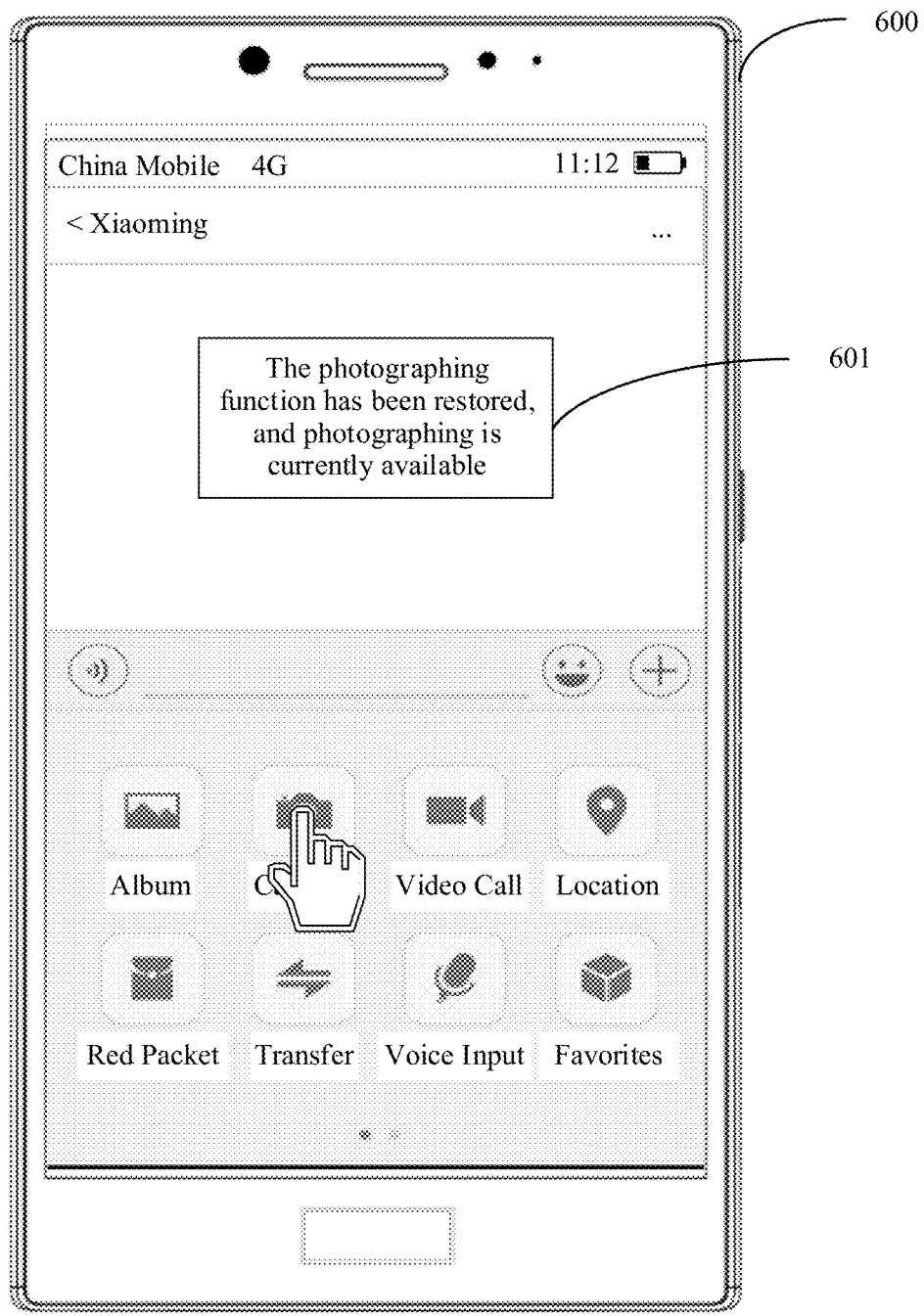
FIG. 6 is a schematic diagram of another user interface of WeChat according to an embodiment of this application.
Figures 1, 7A:
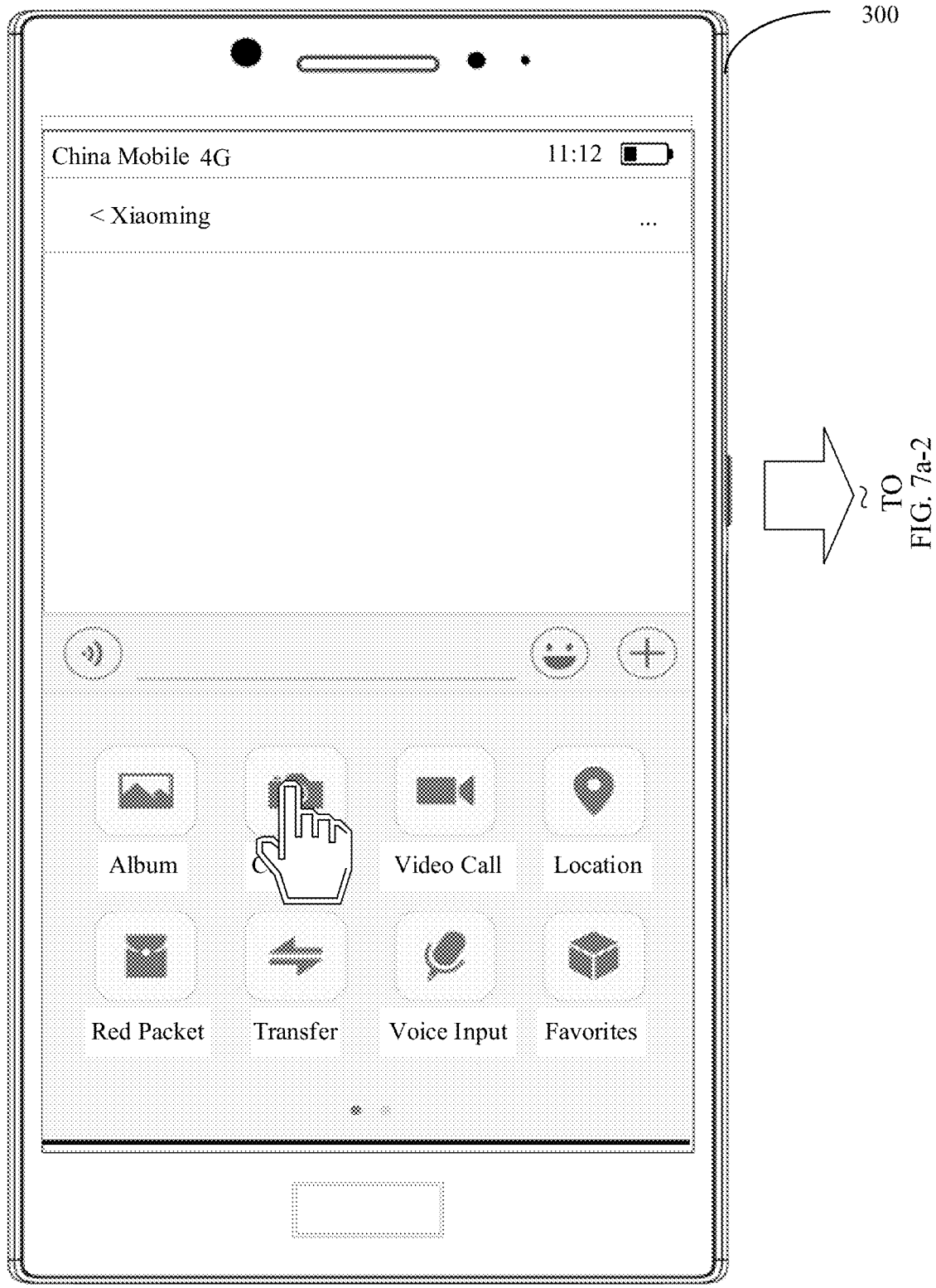
Figures 2, 7A:
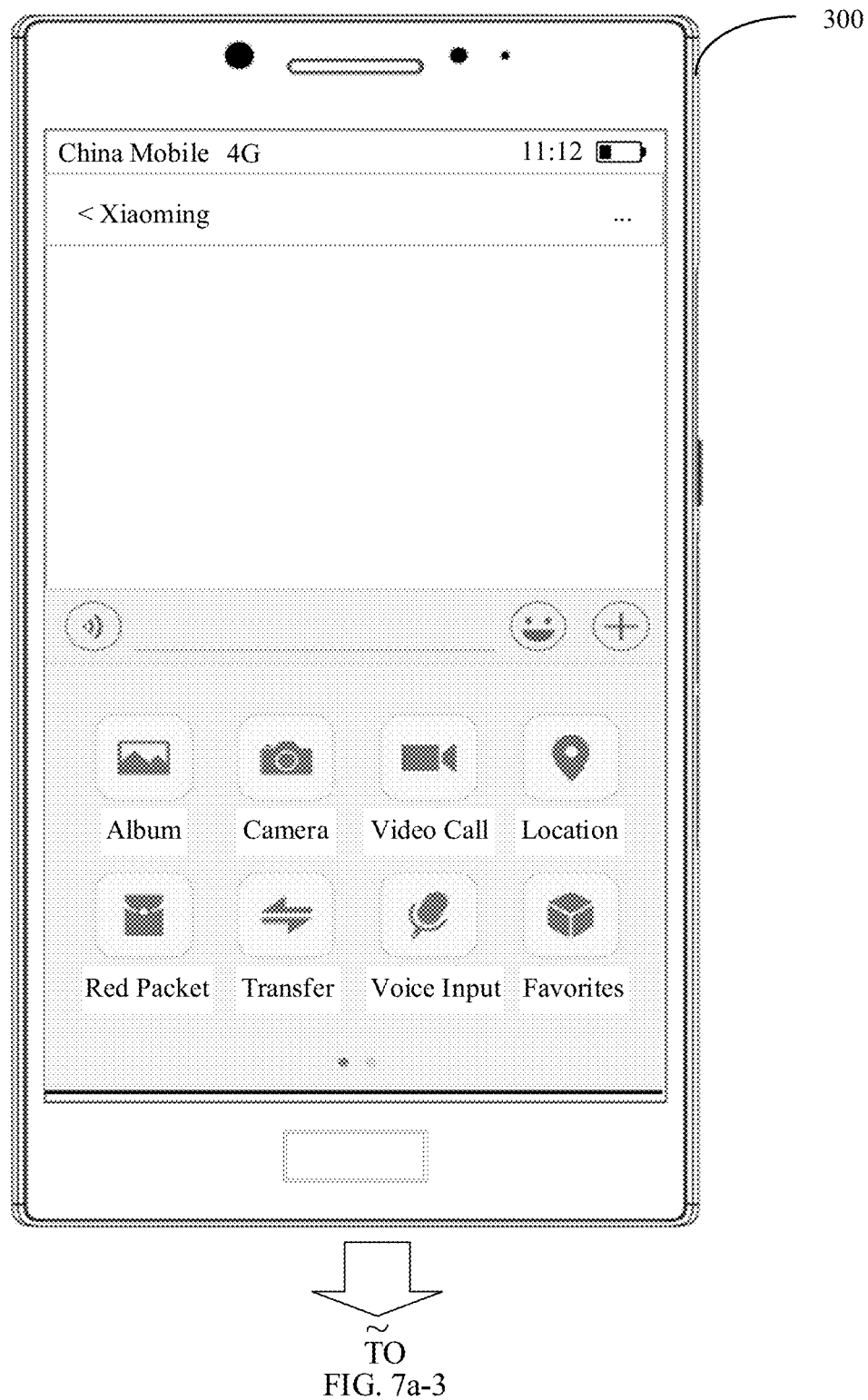
Figures 3, 7A:
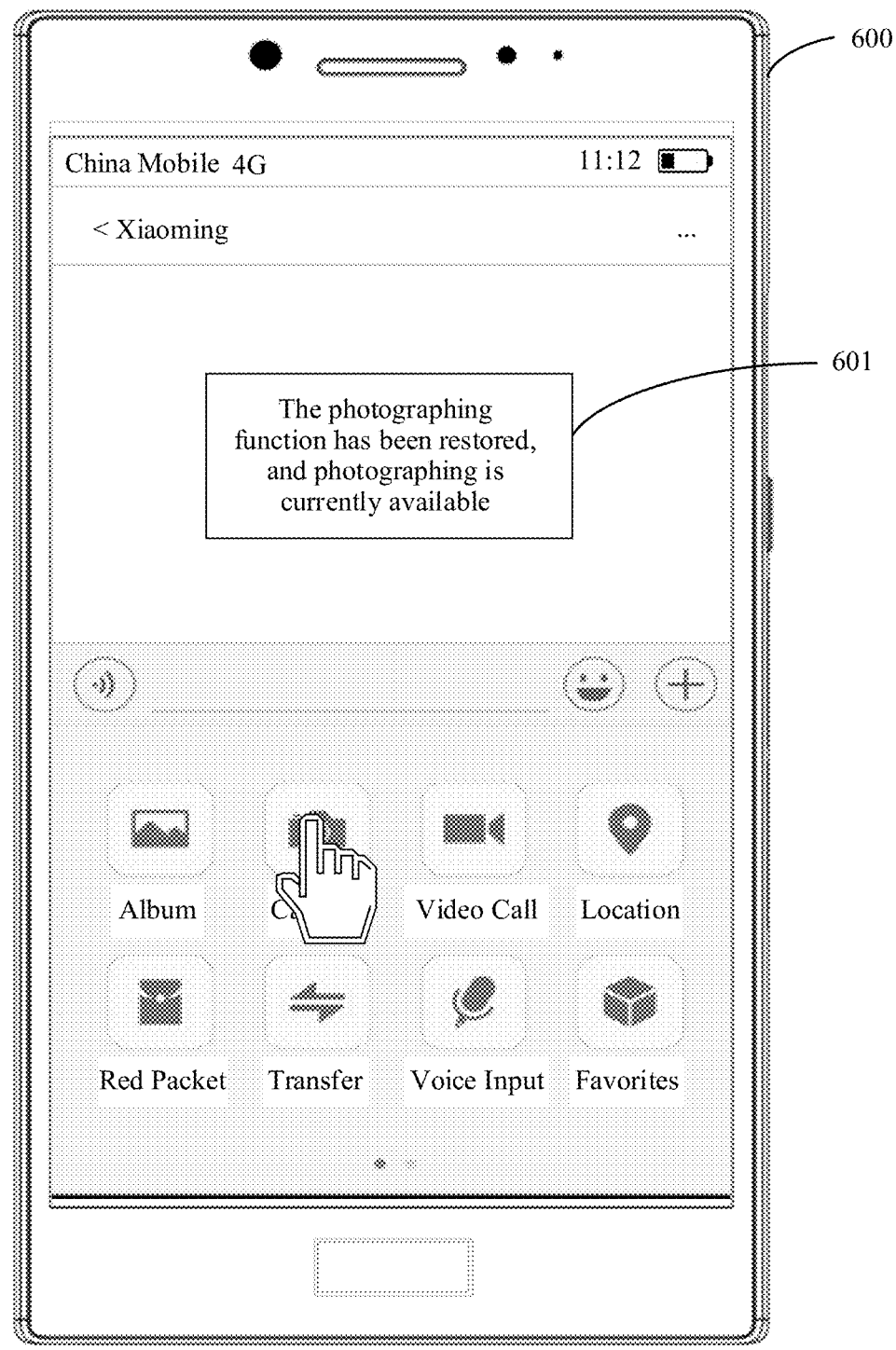
Figures 4, 7A:
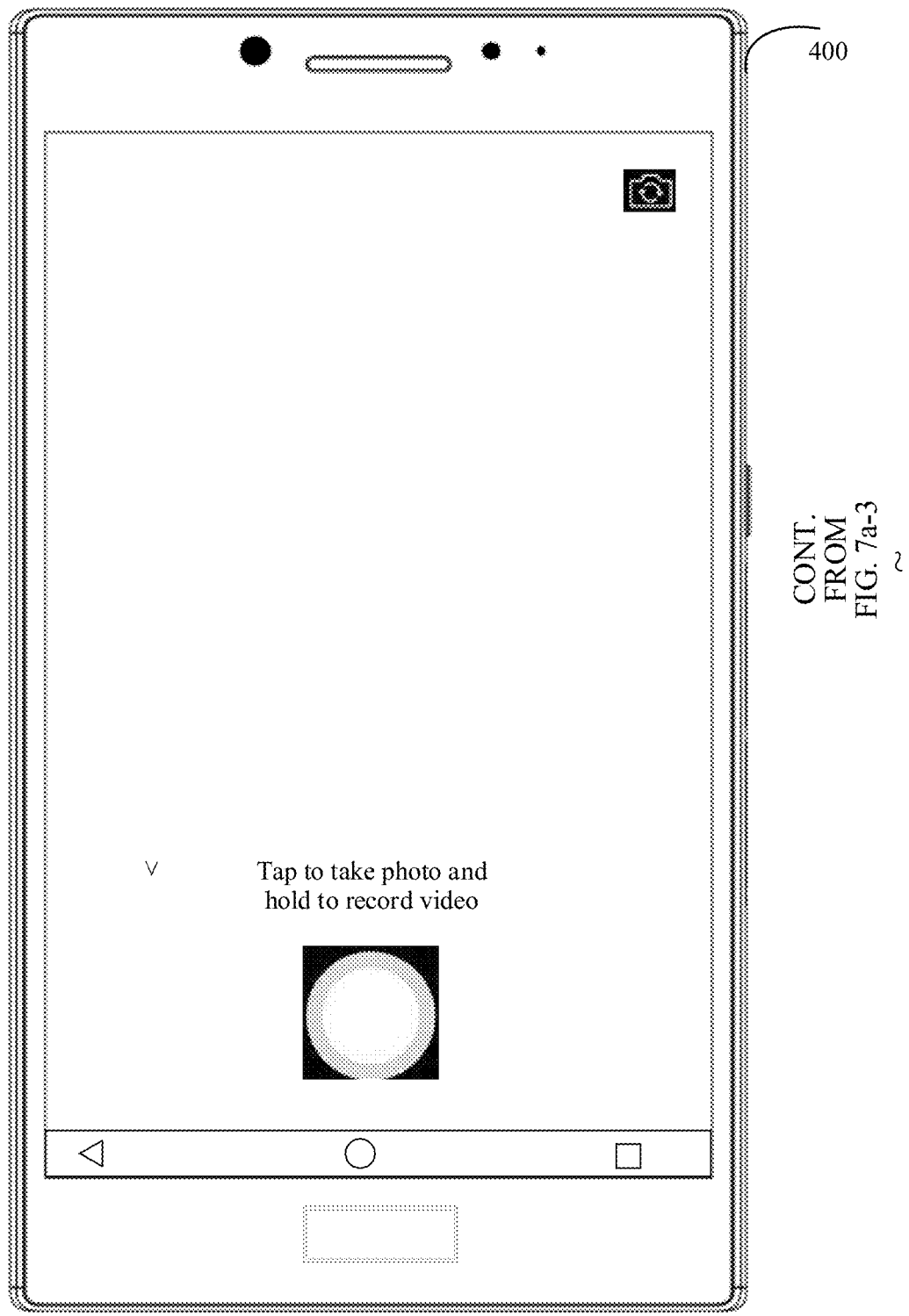
Figures 1, 7B:
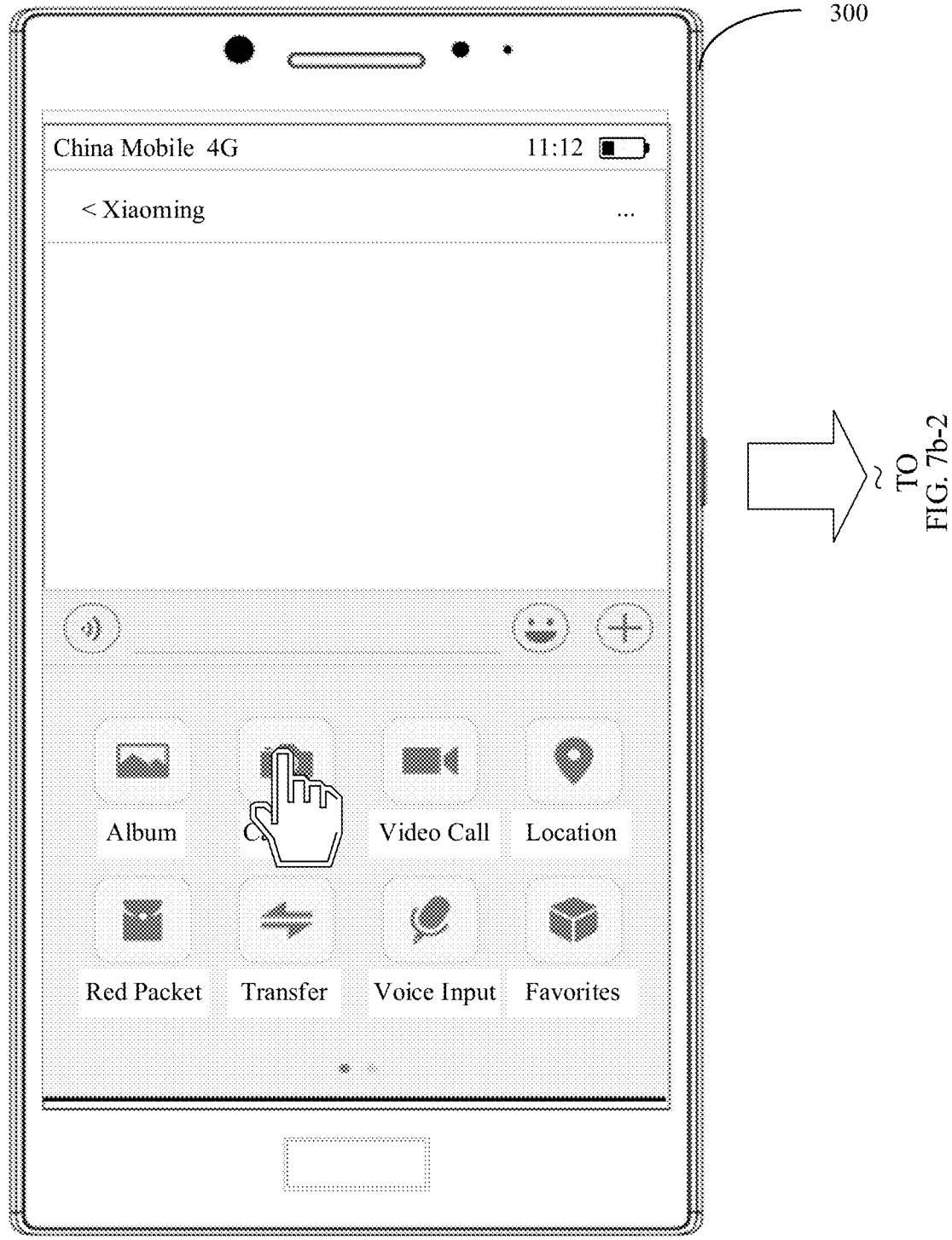
Figures 2, 7B:
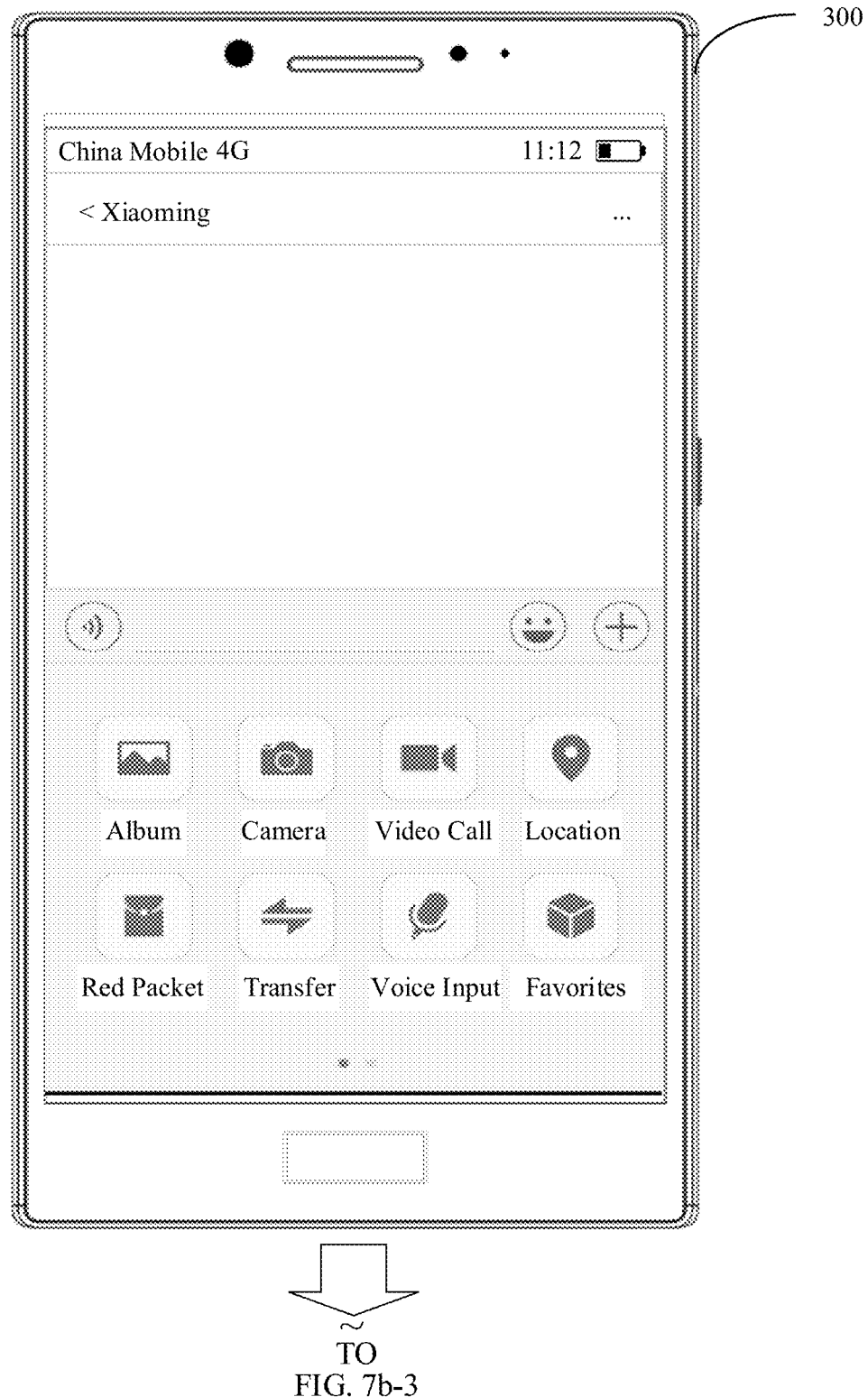
Figures 3, 7B:
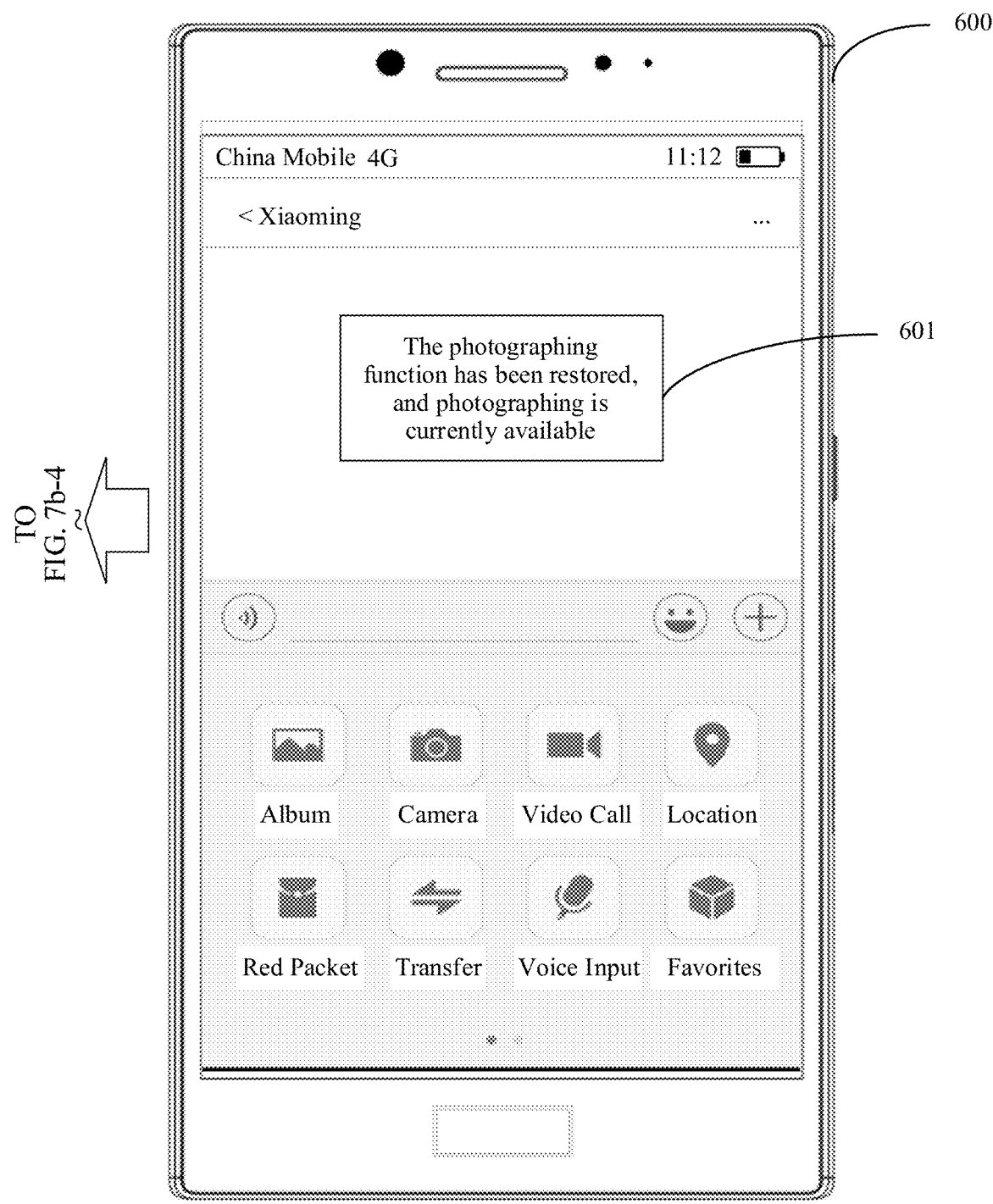
Figures 4, 7B:
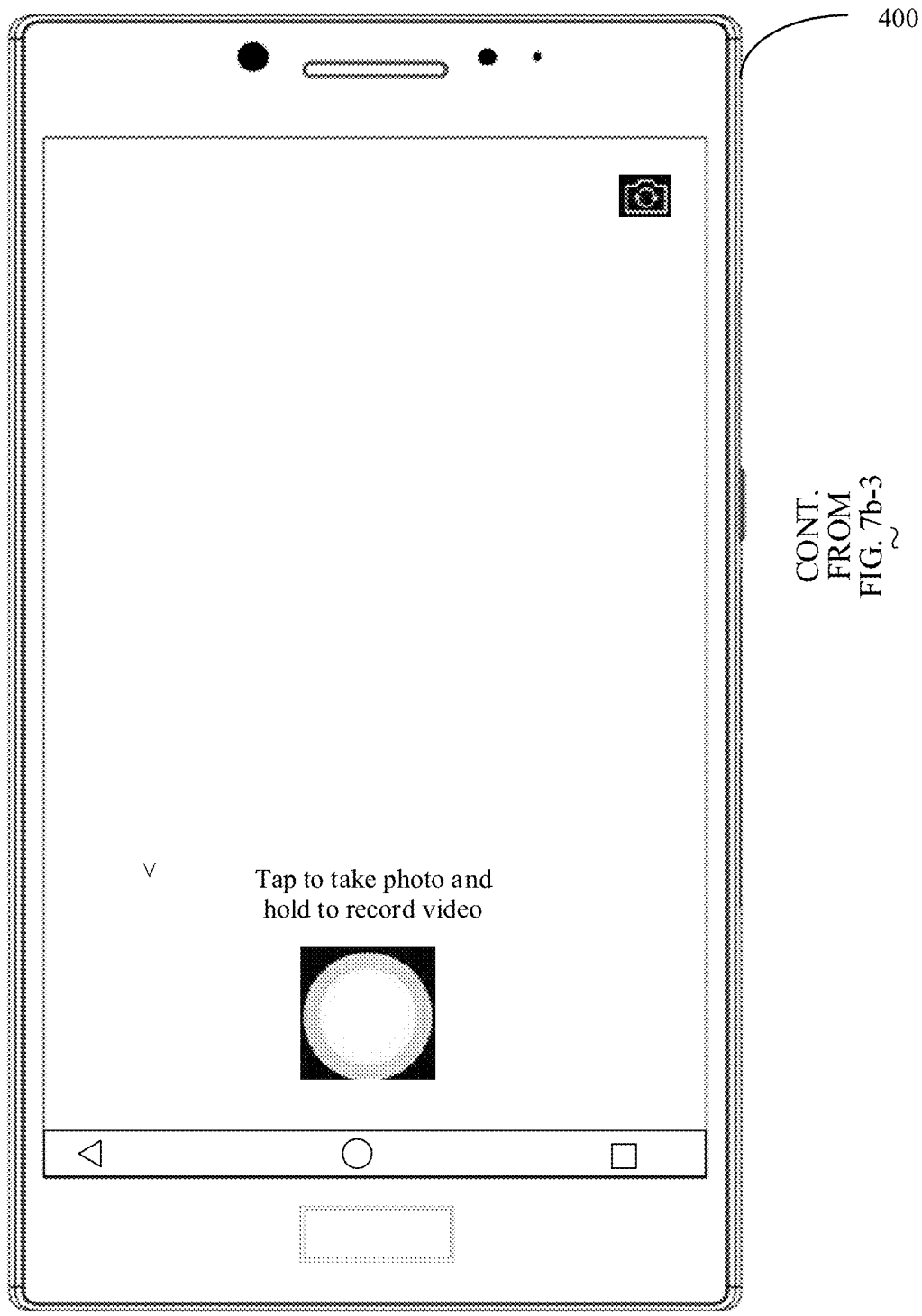

In an example, after the first duration, the touchscreen of the terminal 100 displays a first user interface. The first user interface is used to prompt the user that the first function is restored. After the user receives a prompt of the first user interface, the user performs an operation on the user interface of the application. The terminal 100 responds to the operation, and implements the first function. A WeChat user interface is used as an example for detailed description. After the first duration, the touchscreen of the terminal 100 displays a user interface 600 shown in FIG. 6. The user interface 600 includes a prompt icon 601 for prompting the user that the photographing function is restored. The prompt icon 601 may display predetermined duration. After the predetermined duration, the user interface 600 automatically exits. After receiving a prompt of the prompt icon 601, the user may touch the photographing icon, and the touchscreen of the terminal displays the user interface 400 shown in FIG. 4. For an entire implementation process of this example, refer to FIG. 7*a*-1, FIG. 7*a*-2, FIG. 7*a*-3, and FIG. 7*a*-4.

In an example, after the first duration, the touchscreen of the terminal 100 displays the first user interface and responds to the operation on the user interface of the application. A WeChat user interface is used as an example. For an entire implementation process, refer to FIG. 7*b*-1, FIG. 7*b*-2, FIG. 7*b*-3, and FIG. 7*b*-4.

Figure 8:
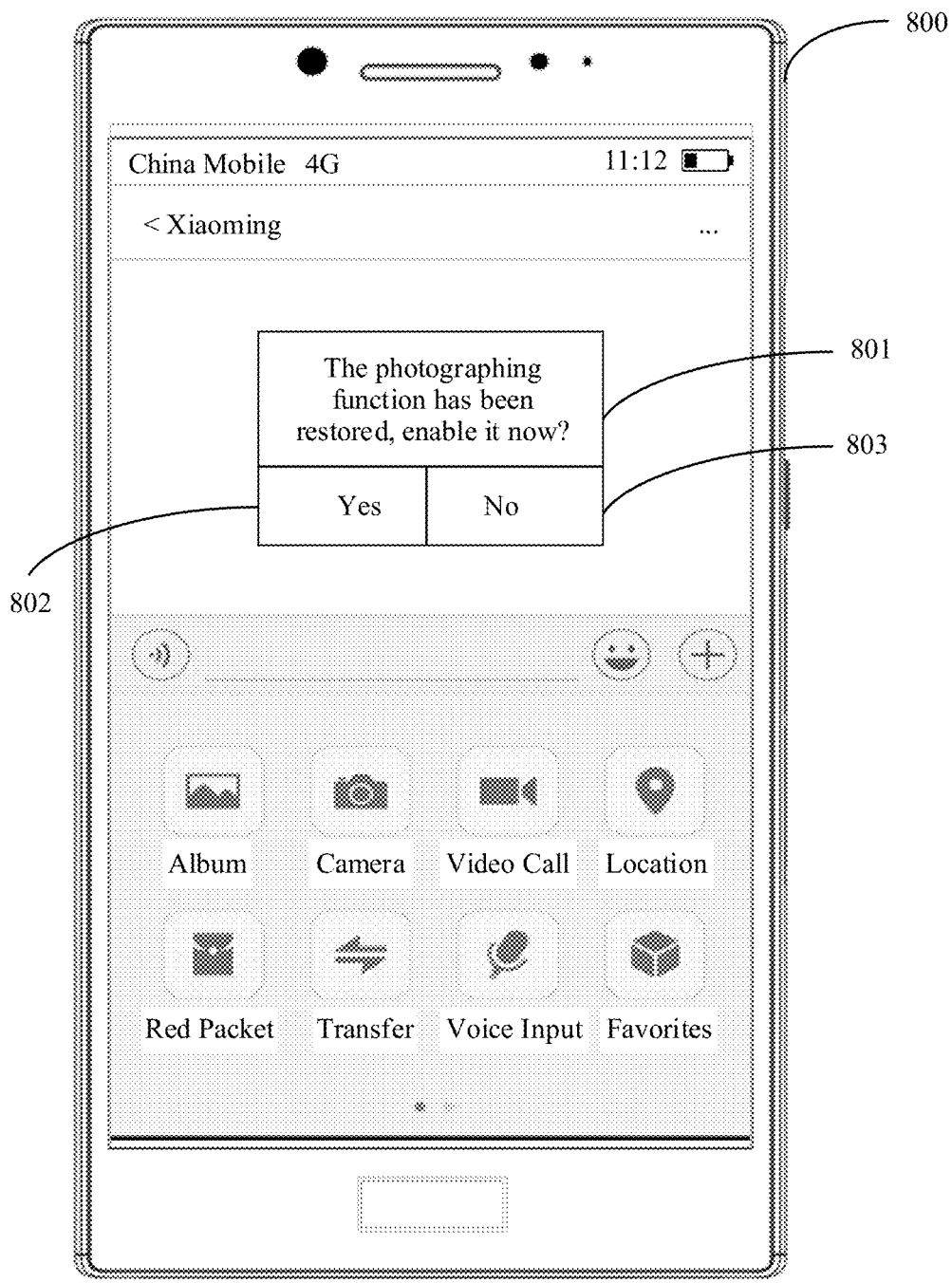
FIG. 8 is a schematic diagram of another user interface of WeChat according to an embodiment of this application.
Figure 9A:
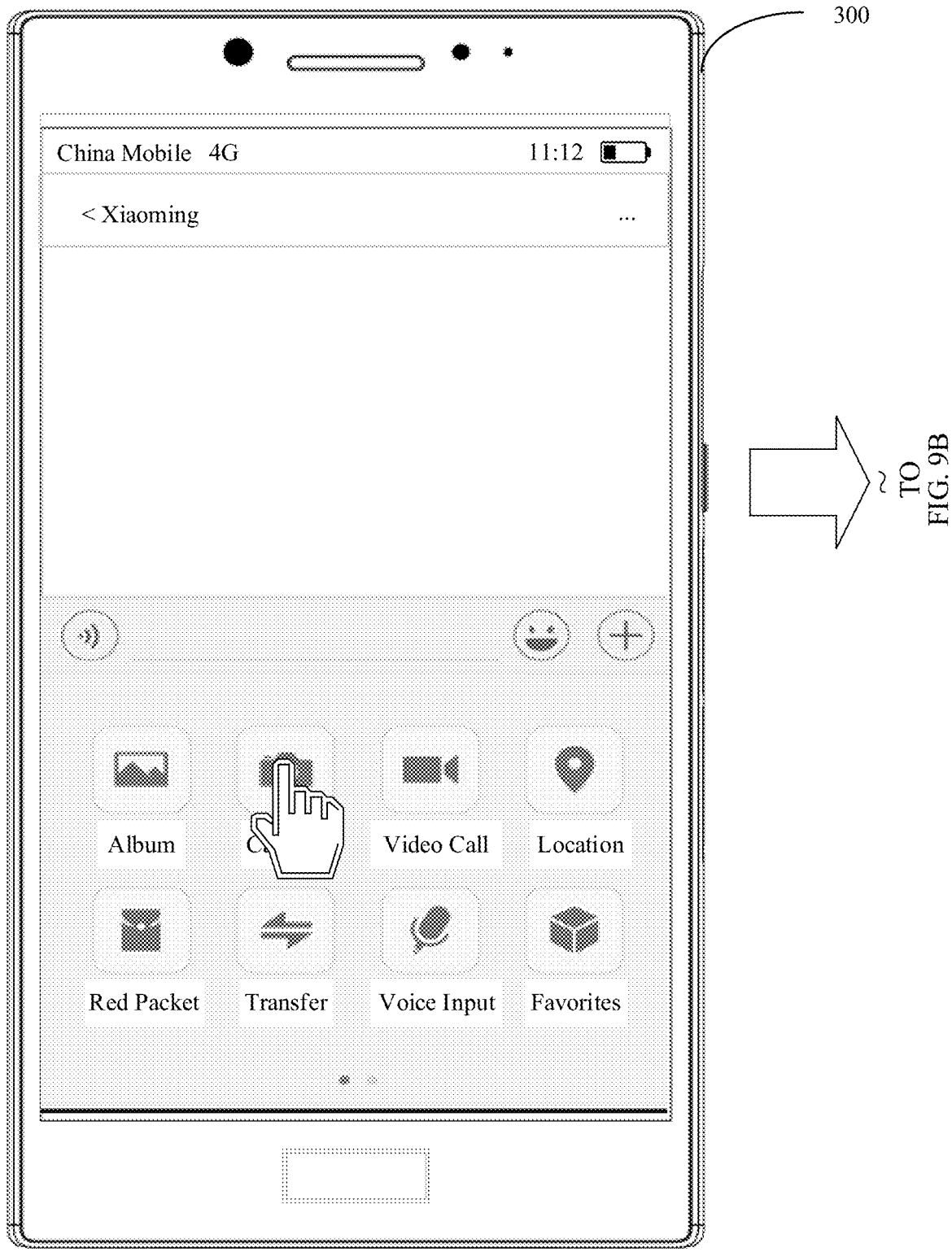
FIG. 9A, FIG. 9B, FIG. 9C, and FIG. 9D are schematic diagrams of another user interface of WeChat according to an embodiment of this application.
Figure 9B:
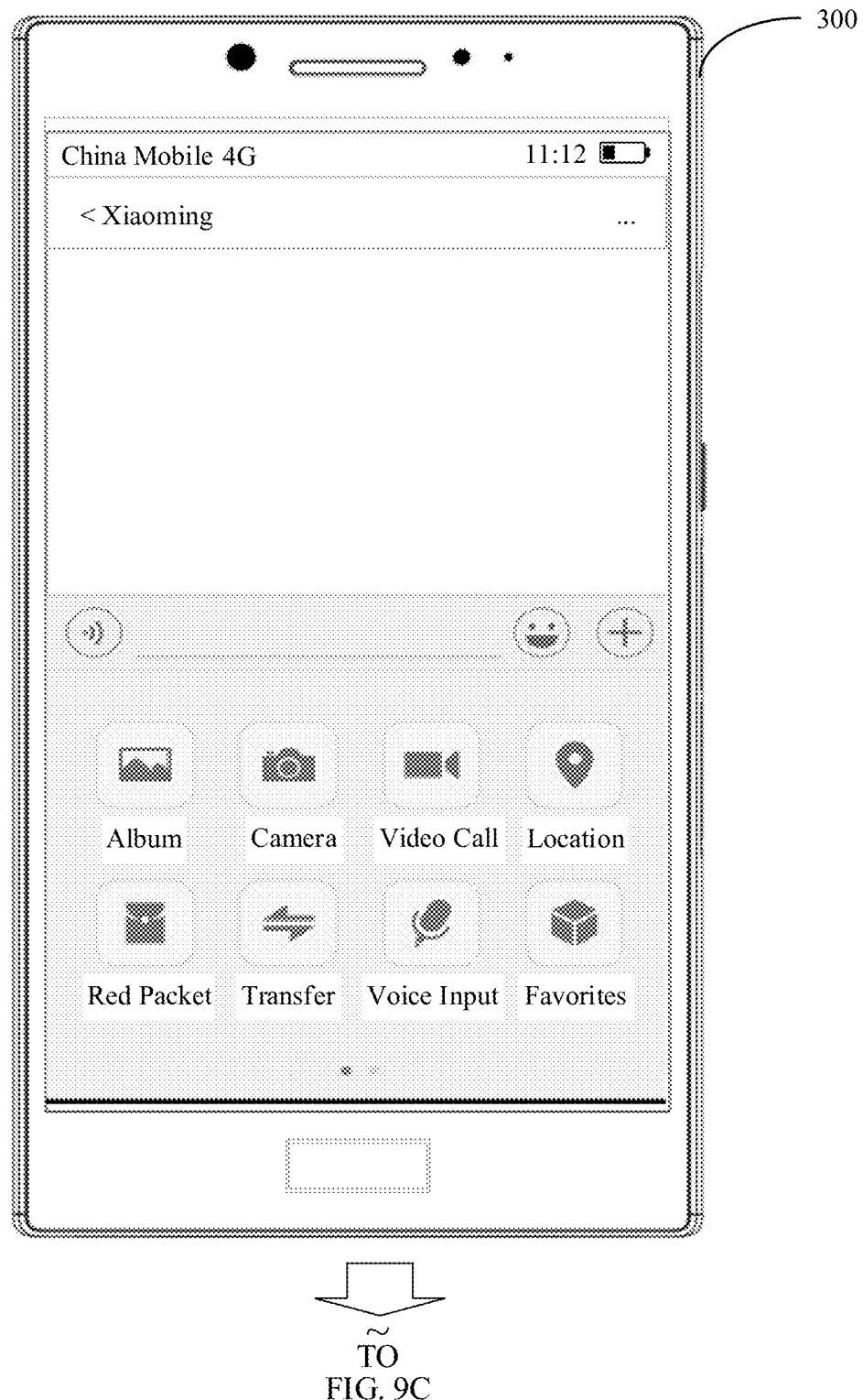
Figure 9C:
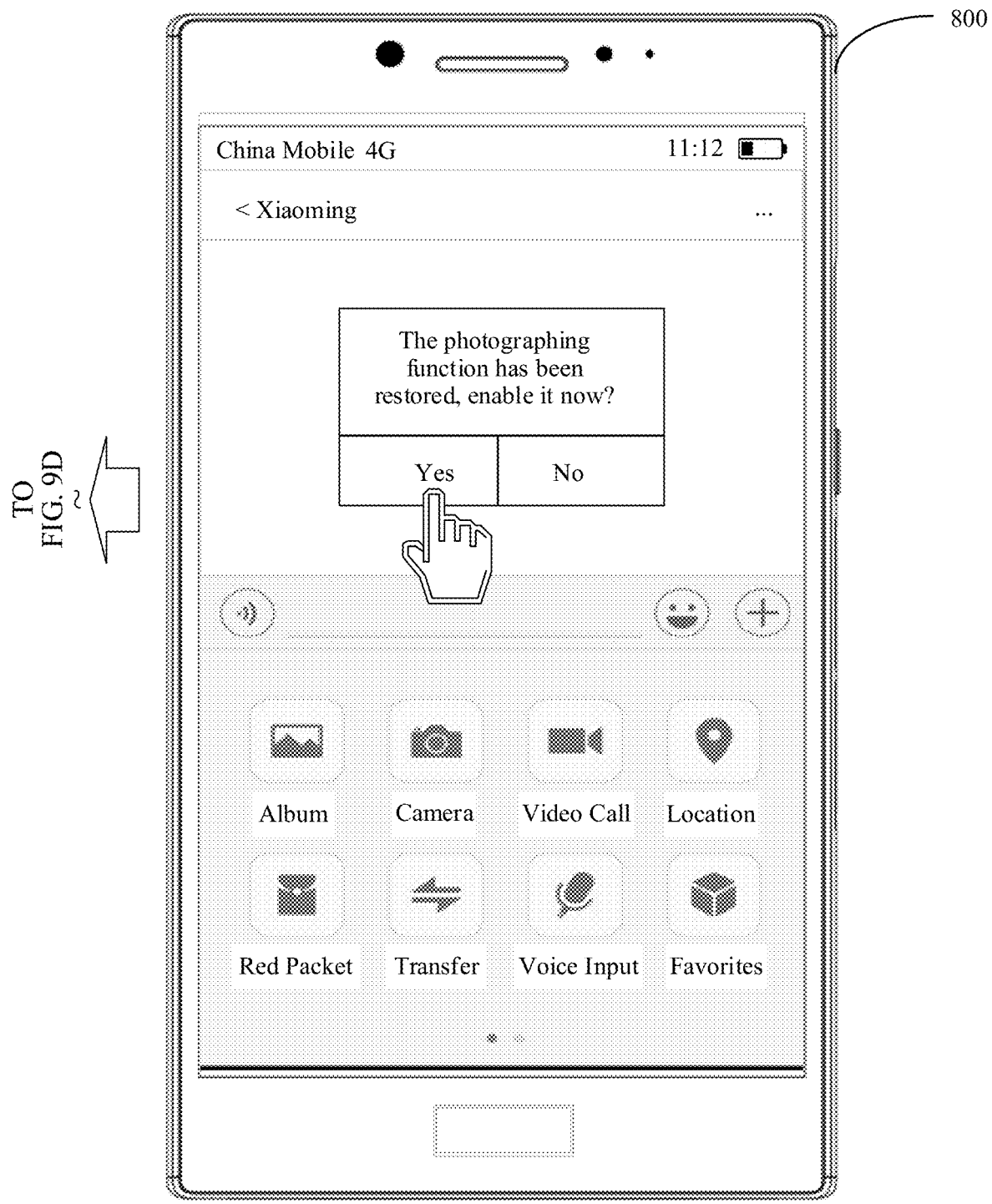
Figure 9D:
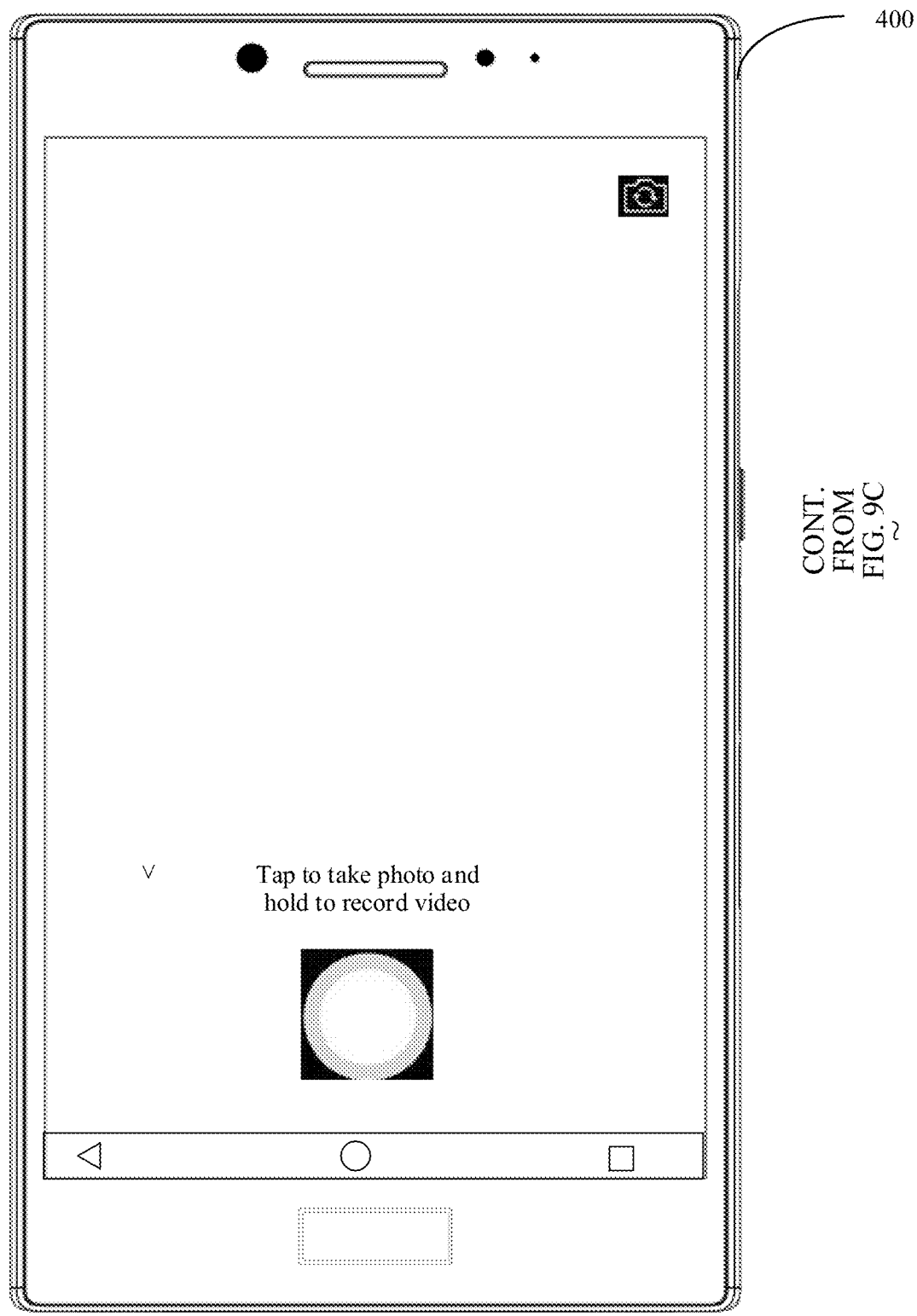

In an example, after the first duration, the touchscreen of the terminal 100 displays a second user interface. The second user interface is used to prompt the user that the first function is restored. After receiving a prompt of the second user interface, the user performs an operation on the second user interface or the user interface of the application. The terminal responds to the operation, and implements the first function. An operation performed by the user on the second user interface or the user interface of the application may be but is not limited to an operation such as touch, pressing, or sliding. A WeChat user interface is used as an example for detailed description. After the first duration, the touchscreen of the terminal 100 displays a user interface 800 shown in FIG. 8. The user interface 800 shown in FIG. 8 includes a prompt icon 801 for prompting the user that the photographing function is restored, a "yes" button 802 for starting the photographing function, and a "no" button 803 for terminating the photographing function. When the terminal 100 detects a touch operation on the "yes" button 802, in response to the touch operation, a photographing process is called, and the touchscreen displays the user interface shown in FIG. 4. When the terminal 100 detects a touch operation on the "no" button 803, in response to the touch operation, the touchscreen continues to display the user interface shown in FIG. 3. For an entire implementation process of this example, refer to FIG. 9A, FIG. 9B, FIG. 9C, and FIG. 9D.

Figure 10:
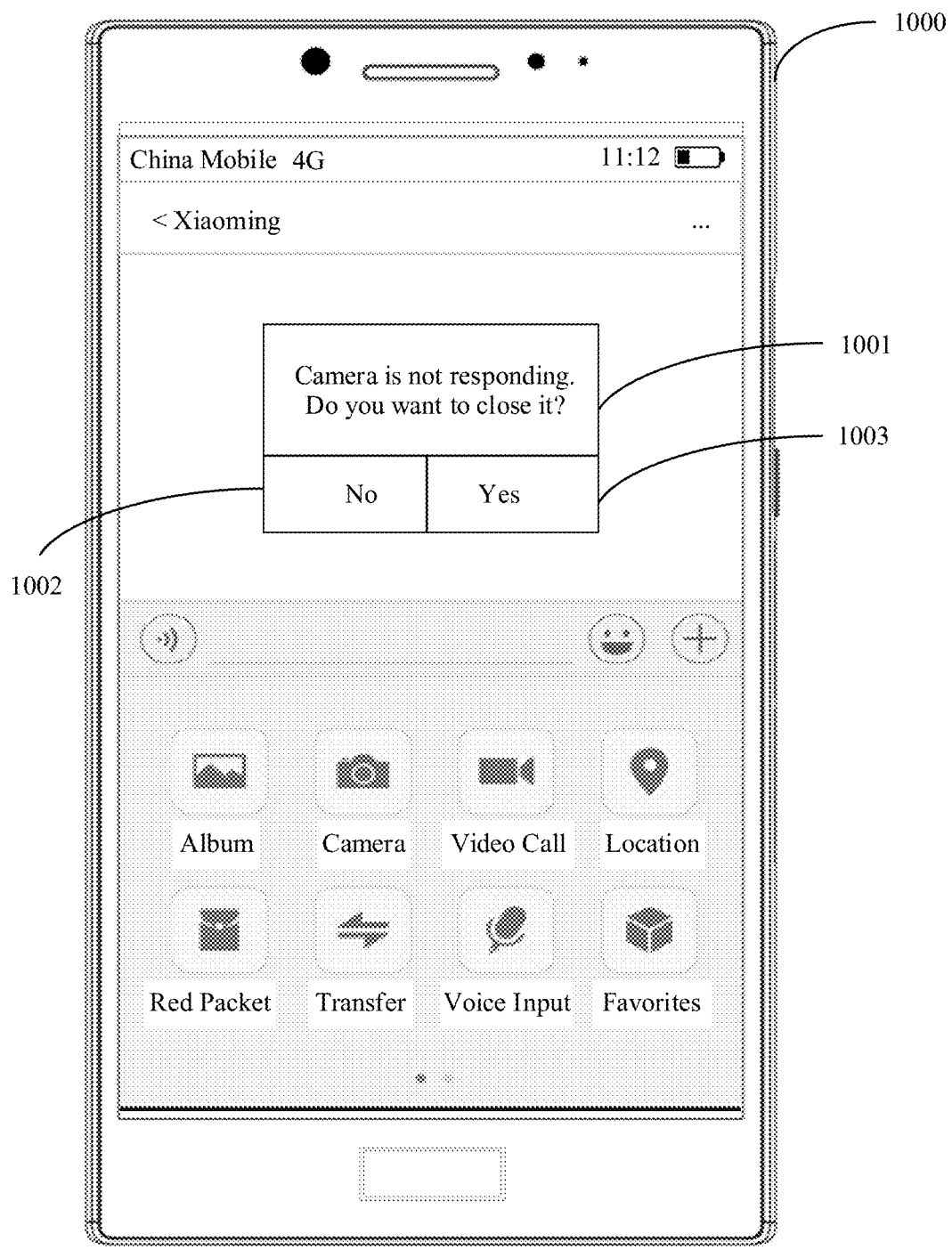
FIG. 10 is a schematic diagram of another user interface of WeChat according to an embodiment of this application.

Optionally, the terminal 100 displays a third user interface on the touchscreen before the terminal 100 terminates or restarts the first function process. The third user interface is used to remind the user to terminate or restart the first function process. The foregoing example in which the photographing process is called in WeChat is still used. As shown in FIG. 10, the touchscreen of the terminal displays a user interface 1000, and the user interface 1000 includes a prompt icon 1001, a "no" button 1002, and a "yes" button 1003. For specific content of the prompt icon 1001, refer to FIG. 10. If the terminal 100 detects a touch operation on the "no" button 1002, in response to the touch operation, the touchscreen continues to display the user interface 300 shown in FIG. 3. If the terminal 100 detects a touch operation on the "yes" button 1003, in response to the touch operation, the photographing process is terminated or restarted in the background.

Figure 11:
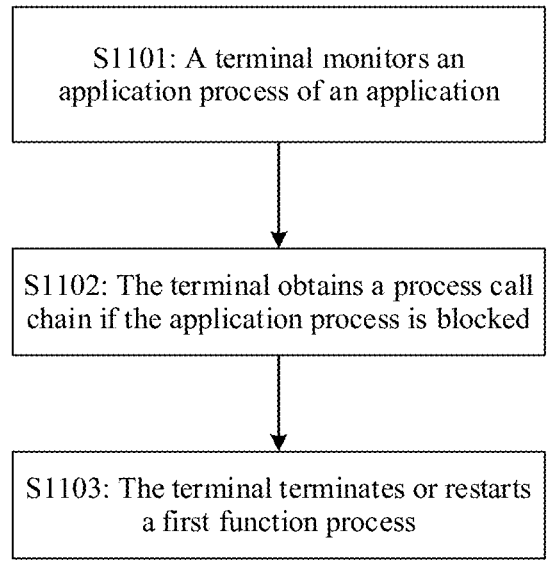
FIG. 11 is a schematic flowchart of a screen freezing processing method according to an embodiment of this application.

Based on the foregoing user interface, as shown in FIG. 11, an embodiment of this application provides a procedure of a screen freezing processing method. The procedure may be as follows:

S1101: A terminal monitors an application process of an application. For example, the application may be WeChat in the foregoing embodiment.

Specifically, the application process may include a main thread and a monitoring thread. The monitoring thread may be, but is not limited to, a thread preset in the application process. The monitoring thread may monitor the main thread to determine whether the main thread is blocked. If the main thread is blocked, it may be determined that the application process is blocked. For example, if the main thread is processing a first task at a first moment, and the main thread is still processing the first task at a second moment, it may be determined that the main thread is blocked. For another example, if there are 110 to-be-processed tasks in a queue of the main thread at a first moment, and there are still 110 to-be-processed tasks in a queue of the main thread at a second moment, it may be determined that the main thread is blocked.

S1102: The terminal obtains a process call chain if the application process is blocked, where the process call chain includes at least a call relationship between the application process and a first function process, and the process call chain may also be referred to as a binder call chain.

Specifically, the terminal may obtain call relationships between different processes, and then determine a process call chain based on the call relationships between the different processes. Optionally, a binder node file may be newly added to the terminal, and the binder node file may store a call relationship between different processes. In an example, the call relationship between different processes may be: a process A to a process B, and a process B to a process C. In this case, the process call chain may be A→B→C. In other words, a function of the process A is implemented by calling the process C. Specifically, the process A may send a call request to the process B, the process B sends a call request to the process C, the process C returns a response to process B, and the process B returns a response to the process A.

S1103: The terminal terminates or restarts the first function process.

Specifically, the first function process may include one or more subprocesses, and the terminal may terminate one process or a plurality of subprocesses in the first function process.

In an implementation, the terminal obtains duration of responding to a request by different processes when the different processes are called, and terminates or restarts one or more subprocesses in the first function process based on duration of responding to a request by each process. For example, the terminal obtains duration of responding to a request by each subprocess in the first function process, and terminates, in the first function process, a subprocess whose duration of responding to a request is greater than or equal to a first threshold; or terminates, in the first function process, a subprocess whose duration of responding to a request is the longest. For example, the process call chain is A→B→C. A sends a request to B, and A waits for a response from B for 1 second. B sends a request to C, and B waits for a response from C for 2 seconds. In this case, a process whose duration of responding to a request is the longest may be terminated or restarted, that is, the process C is terminated or restarted; or a process whose duration of responding to a request is longer than 1 second may be terminated or restarted, that is, the process B and the process C are terminated or restarted. Optionally, the binder node file may store duration of responding to a request by different nodes. It may be understood that, if A sends a request for calling B to B at a first moment, and B responds to the request of A at a second moment, the foregoing duration for responding to a request may be duration between the second moment and the first moment. The duration for responding to a request may also be referred to as duration for waiting for a response by A.

In this embodiment of this application, if the application process of the application is blocked, the first function process that is actually blocked is determined based on the process call chain, and the first function process is terminated or restarted. Compared with a solution in which an application is terminated or restarted if an application process of the application is blocked, this embodiment of this application can reduce a probability that a problem occurs again in the application process, because the first function process in which the problem actually occurs is terminated or restarted.

In an example, a specific implementation of the procedure shown in FIG. 11 may be as follows: The terminal monitors and records blocking duration of the application process. If the blocking duration of the application process is greater than or equal to a first threshold, the terminal obtains a process call chain. The first threshold is less than N, and N may be but is not limited to 5 s, 10 s, or the like. At an $N^{th}$ moment, the application process is continuously blocked. In this case, the first function process is terminated or restarted. Compared with a solution, the solution in this embodiment of this application can increase a screen freezing processing speed of the terminal and improve user experience, because the process call chain is obtained after the application process is blocked for N seconds.

Optionally, the procedure shown in FIG. 11 may further include: obtaining a call stack of the application process and a call stack of the first function process based on the process call chain. The call stack of the application process and the call stack of the first function process are used to analyze a reason why the terminal does not respond to the operation on the user interface of the application. Compared with a solution in which the terminal captures all currently running call stacks if a screen of a user interface of an application process is frozen, the solution in this embodiment of this application can reduce a quantity of captured call stacks, thereby reducing additional hang duration caused by capturing of the call stacks.

In this embodiment of this application, a binder node file may be newly added to the terminal, and the binder node file may store a call relationship between different processes. The terminal can parse the binder node file to obtain the calling relationship between different processes and determine the process call chain.

Optionally, the binder node file may include source information of an asynchronous binder message, to compensate for a defect that a native Android system cannot identify an asynchronous binder call relationship. The binder node file may include waiting duration of a binder message in a queue, thereby compensating for a defect that a native Android system cannot identify a blocking message and a non-blocking message. In addition, compared with a file of the native Android system, the binder node file can re-integrate information and remove useless parts to improve a speed of identifying the process call chain. For example, when the file of the native Android system is used, the speed of identifying the process call chain is thousands of milliseconds. Use of the newly added binder node file in this embodiment of this application can improve the speed of identifying the process call chain to tens of milliseconds or even several milliseconds.

For example, binder information in the newly added binder node file may be as follows:

| async |
|---|
| 6611:6611 to 6586:0 code 1 wait: 38.108410949 s |
| 6593:6593 to 6586:0 code 2 wait: 52.243625106 s |
| 1143:1499 to 551:781 code 4 wait: 0.118732292 s |

| pid | context | request | started | max | ready | free async space |
|---|---|---|---|---|---|---|
| 6611 | binder | 0 | 0 | 15 | 0 | 520192 |
| 6593 | binder | 0 | 0 | 15 | 0 | 520192 |
| 6586 | binder | 0 | 1 | 1 | 0 | 518896 |
| 1143 | hwbinder | 0 | 4 | 4 | 5 | 520192 |
| 1143 | binder | 0 | 26 | 31 | 27 | 520192 |
| 551 | hwbinder | 0 | 1 | 1 | 1 | 520192 |

Optionally, the terminal parses the binder node file, and may further obtain binder information such as a binder memory and a binder thread quantity. The binder information such as the binder memory and the binder thread quantity can help a developer perform troubleshooting quickly, thereby improving overall efficiency of resolving a problem by a research and development system. The binder information may be applied to various scenarios. For example, the binder information is applied to a scenario of a format of a log for resolving a problem by research and development. The log may be but is not limited to an application not responding (ANR) log.

Figure 12:
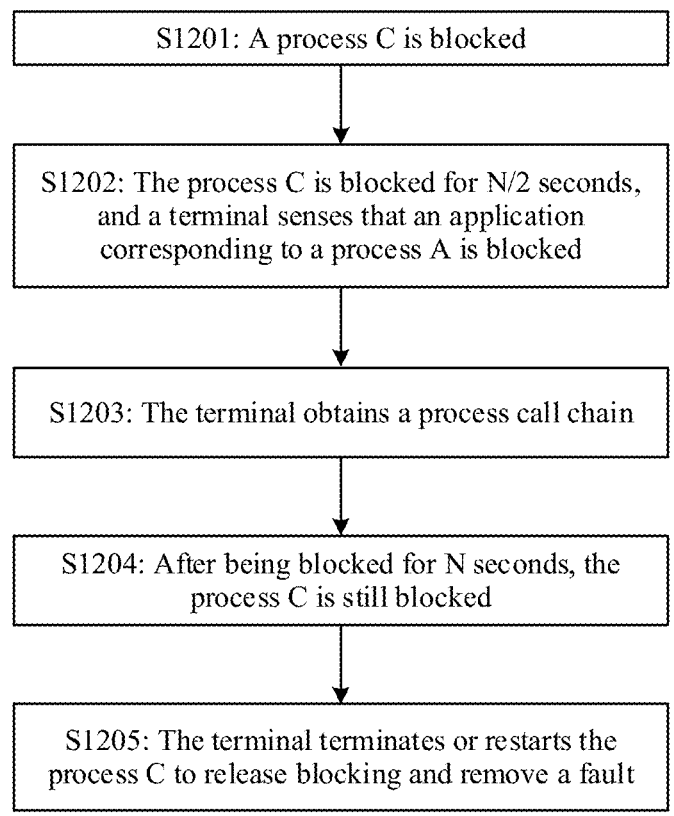
FIG. 12 is another schematic flowchart of a screen freezing processing method according to an embodiment of this application.

As shown in FIG. 12, an embodiment of this application further provides a procedure of a blocking processing method. The procedure may be applied to recovery from a hang or stalling of an application. The procedure is described by using an example in which a process call chain is A→B→C and the process C is blocked. The procedure may be as follows:

S1201: The process C is blocked.

S1202: The process C is blocked for N/2 seconds, and a terminal senses that an application corresponding to the process A is blocked.

S1203: The terminal obtains the process call chain, where the process call chain is also referred to as a binder call chain.

S1204: After being blocked for N seconds, the process C is still blocked.

S1205: The terminal terminates or restarts the process C to release blocking and remove a fault.

In this embodiment of this application, the terminal may monitor a main thread of a foreground application, and when the main thread is stuck or frozen, identify the process call chain to find a blocked process. The foreground application is restored by terminating or restarting the blocked process. The main thread may also be referred to as a user interface (UI) process.

Figure 13:
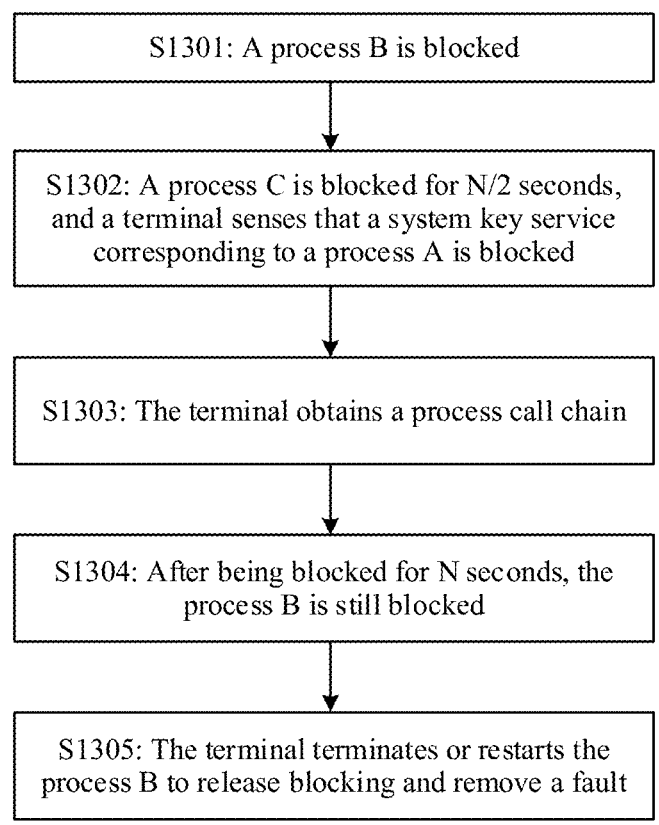
FIG. 13 is another schematic flowchart of a screen freezing processing method according to an embodiment of this application.

As shown in FIG. 13, an embodiment of this application further provides a procedure of a blocking processing method. The procedure may be applied to recovery from a hang or stalling of a system key service (such as an AMS or a VMS). The procedure is described by using an example in which a process call chain is A→B and the process B is blocked. The procedure may be as follows:

S1301: The process B is blocked.

S1302: A process C is blocked for N/2 seconds, and a terminal senses that a system key service corresponding to the process A is blocked.

S1303: The terminal obtains the process call chain.

S1304: After being blocked for N seconds, the process B is still blocked.

S1305: The terminal terminates or restarts the process B to release blocking and remove a fault.

In this embodiment of this application, a fault caused by blocking of a process call chain can be quickly and automatically recovered, thereby improving user experience, shortening duration of a screen freezing fault caused by blocking of a process call chain, improving user experience, capturing a more accurate log, improving a problem-resolving speed of an R&D system, and reducing R&D costs.

Figure 14:
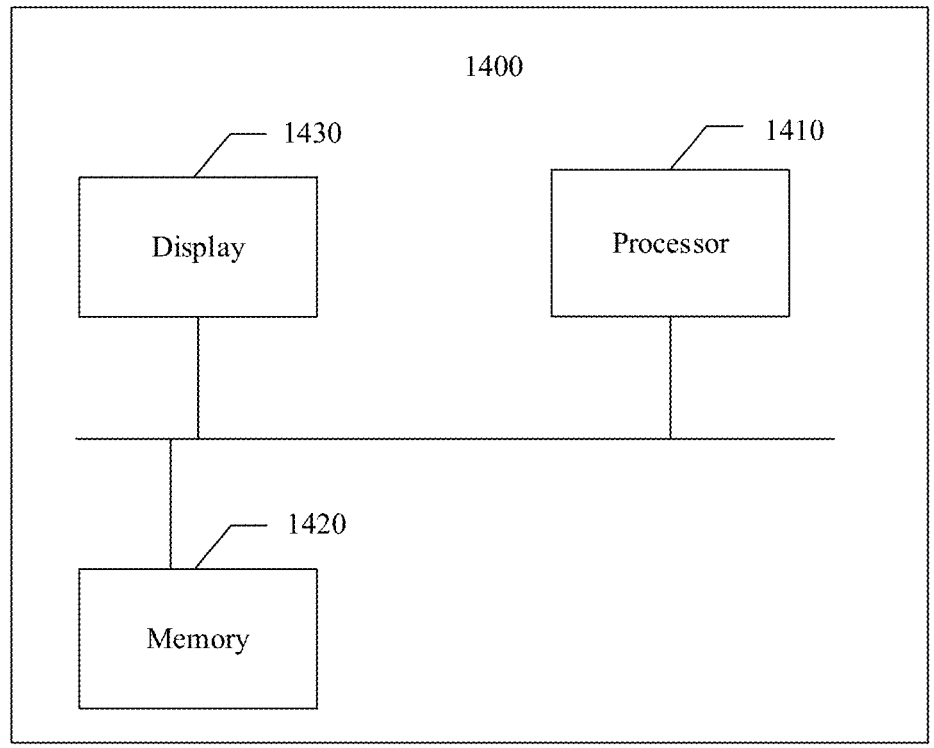
FIG. 14 is a schematic structural diagram of a terminal according to an embodiment of this application.

FIG. 14 shows a terminal 1400 according to an embodiment of this application. For example, the terminal 1400 includes at least one processor 1410, a memory 1420, and a display 1430. The processor 1410 is coupled to the memory 1420 and the display 1430. The coupling in this embodiment of this application may be a communication connection, may be an electrical connection, or may be in another form.

The display 1430 is configured to display a user interface of an application.

The memory 1420 stores one or more computer programs.

The processor 1410 is configured to: call the one or more computer programs stored in the memory 1420, to receive an operation on the user interface; within first duration, skip responding to the operation on the user interface, and skip implementing a first function; and after the first duration, respond to the operation on the user interface, and implement the first function. The operation on the user interface is used to implement the first function.

Specifically, the first duration includes a time point A and a time point B. When the time point A is reached, the processor 1410 obtains a process call chain. The process call chain includes at least a call relationship between an application process and a first function process. The application process is a process corresponding to the application. The first function process is a process that is associated with the application and that is used to implement the first function. When the time point B is reached, the processor 1410 still does not respond to the operation on the user interface, and terminates or restarts the first function process, to restore the first function. Alternatively, when the time point B is reached, the processor 1410 responds to the operation on the user interface, and does not terminate or restart the first function process.

Optionally, that the processor 1410 responds to the operation on the user interface, and implements the first function includes: The processor 1410 controls the display 1430 to display a first user interface. The first user interface is used to prompt a user that the first function is restored.

Optionally, that the processor 1410 responds to the operation on the user interface, and implements the first function includes: The processor 1410 controls the display 1430 to display a second user interface. The second user interface is used to prompt a user that the first function is restored. The processor 1410 receives an operation on the second user interface or the user interface of the application. The processor 1410 responds to the operation on the second user interface or the user interface of the application, and implements the first function.

Optionally, that within the first duration, the processor 1410 does not respond to the operation on the user interface, and does not implement the first function includes: The processor 1410 controls the display 1430 to display a third user interface. The third user interface is used to remind the user whether to terminate or restart the first function process.

Optionally, the processor 1410 is further configured to obtain a call stack of the application process and a call stack of the first function process based on the process call chain. The call stack of the application process and the call stack of the first function process are used to analyze a reason why the terminal does not respond to the operation on the user interface of the application.

It should be understood that the terminal 1400 may be configured to implement the screen freezing processing method in the embodiments of this application. For related features, refer to the foregoing descriptions. Details are not described herein again.

Figure 15:
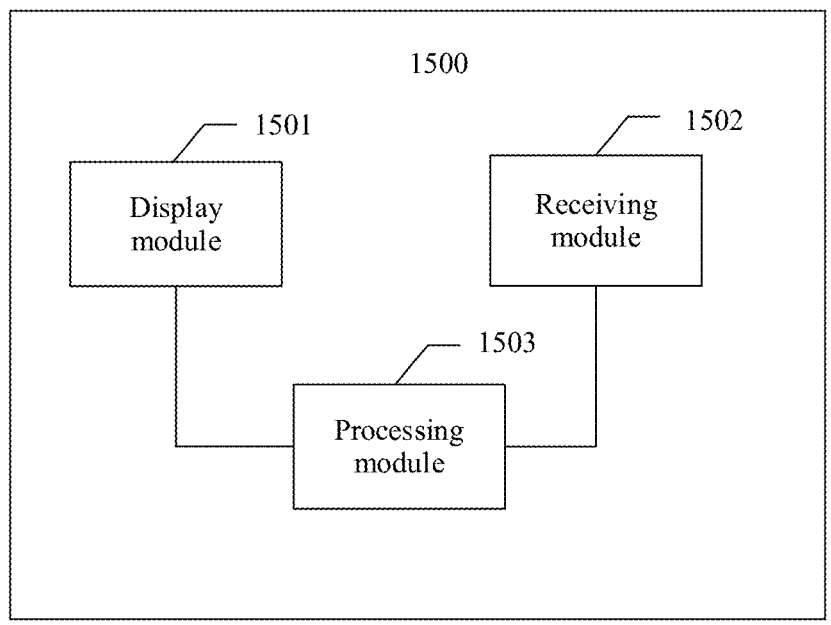
FIG. 15 is a schematic structural diagram of a screen freezing processing apparatus according to an embodiment of this application.

FIG. 15 shows a screen freezing processing apparatus 1500 according to an embodiment of this application. The screen freezing processing apparatus 1500 includes a display module 1501, a receiving module 1502, and a processing module 1503.

The display module 1501 is configured to display a user interface of an application. The receiving module 1502 is configured to receive an operation on the user interface. The operation on the user interface is used to implement a first function. The processing module 1503 is configured to: within first duration, skip responding to the operation on the user interface, and skip implementing the first function; and after the first duration, respond to the operation on the user interface, and implement the first function.

Specifically, the first duration includes a time point A and a time point B. When the time point A is reached, the processing module 1503 obtains a process call chain. The process call chain includes at least a call relationship between an application process and a first function process. The application process is a process corresponding to the application. The first function process is a process that is associated with the application and that is used to implement the first function. When the time point B is reached, the processing module 1503 still does not respond to the operation on the user interface, and terminates or restarts the first function process, to restore the first function. Alternatively, when the time point B is reached, the processing module 1503 responds to the operation on the user interface, and does not terminate or restart the first function process.

Optionally, when responding to the operation on the user interface and implementing the first function, the processing module 1503 is specifically configured to control, by the processing module 1503, the display 1501 to display a first user interface. The first user interface is used to prompt a user that the first function is restored.

Optionally, when responding to the operation on the user interface and implementing the first function, the processing module 1503 is specifically configured to: control the display module to display a second user interface, where the second user interface is used to prompt a user that the first function is restored; control the receiving module 1502 to receive an operation on the second user interface or the user interface of the application; and respond to the operation on the second user interface or the user interface of the application, and implement the first function.

Optionally, when skipping responding to the operation on the user interface and skipping implementing the first function within the first duration, the processing module 1503 is specifically configured to control the display module 1501 to display a third user interface. The third user interface is used to remind the user whether to terminate or restart the first function process.

Optionally, the processing module 1503 is further configured to obtain a call stack of the application process and a call stack of the first function process based on the process call chain. The call stack of the application process and the call stack of the first function process are used to analyze a reason why the terminal does not respond to the operation on the user interface of the application.

It should be understood that the screen freezing processing apparatus 1500 may be configured to implement the screen freezing processing method in the embodiments of this application. For related features, refer to the foregoing descriptions. Details are not described herein again.

A person skilled in the art may clearly understand that the embodiments of this application may be implemented by hardware, or by hardware and software. When it is implemented by using software, code that implements the foregoing functions may be stored in a computer-readable medium.

In summary, what is described above is merely embodiments of the technical solutions of this application, but is not intended to limit the protection scope of this application. Any modification, equivalent replacement, or improvement made without departing from the spirit and principle of the embodiments of the present invention shall fall within the protection scope of the embodiments of the present invention.

What is claimed is:

1. A screen freezing processing method, comprising:
  displaying, by a terminal, a first user interface;
  receiving, by the terminal, a first operation on the first user interface, wherein the first operation on the first user interface is used to implement a first function;
  obtaining, by the terminal, a process call chain when a time point A is reached, wherein the process call chain comprises at least a call relationship between an application process and a first function process, the application process is a process corresponding to an application, and the first function process is associated with the application and is used to implement the first function; and
  terminating or restarting, by the terminal, the first function process to restore the first function, when a time point B is reached and it is determined that the terminal still does not respond to the first operation on the first user interface.

2. The method according to claim 1, wherein after terminating or restarting the first function process, the method further comprises:
  displaying, by the terminal, a second user interface, wherein the second user interface is used to prompt a user that the first function is restored.

3. The method according to claim 1, wherein after terminating or restarting the first function process, the method further comprises:
  displaying, by the terminal, a second user interface, wherein the second user interface is used to prompt a user that the first function is restored;
  receiving, by the terminal, a second operation on the second user interface or on a user interface of the application; and
  responding, by the terminal, to the second operation on the second user interface or on the user interface of the application, and implementing the first function.

4. The method according to claim 1, wherein before terminating or restarting the first function process, the method further comprises:
  displaying, by the terminal, a second user interface, wherein the second user interface is used to prompt a user whether to terminate or restart the first function process.

5. The method according to claim 1, wherein the method further comprises:
  obtaining, by the terminal, a call stack of the application process and a call stack of the first function process based on the process call chain, wherein the call stack of the application process and the call stack of the first function process are used to analyze a reason why the terminal does not respond to the first operation on the first interface of the application.

6. A terminal, comprising:
  one or more processors;
  a display configured to display a first user interface; and
  a memory configured to store one or more computer programs, wherein
  the one or more processors are configured to call the one or more computer programs stored in the memory to:
  receive first operation on the first user interface, wherein the first operation on the first user interface is used to implement a first function;
  obtain a process call chain when a time point A is reached, wherein the process call chain comprises at least a call relationship between an application process and a first function process, the application process corresponds to an application, and the first function process is associated with the application and is used to implement the first function; and
  terminate or restart the first function process to restore the first function, when a time point B is reached and it is determined that the terminal still does not respond to the first operation on the first user interface.

7. The terminal according to claim 6, wherein the one or more processors are configured to call the one or more computer programs stored in the memory to additionally, after terminating or restarting the first function process, control the display to display a second user interface, wherein the second user interface is used to prompt a user that the first function is restored.

8. The terminal according to claim 6, wherein the one or more processors are configured to call the one or more computer programs stored in the memory to additionally, after terminating or restarting the first function process:
　　control the display to display a second user interface, wherein the second user interface is used to prompt a user that the first function is restored;
　　receive a second operation on the second user interface or the user interface of the application; and
　　respond to the second operation on the second user interface or the user interface of the application, and implementing the first function.

9. The terminal according to claim 6, wherein the one or more processors are configured to call the one or more computer programs stored in the memory to additionally, before terminating or restarting the first function process, control the display to display a second user interface, wherein the second user interface is used to prompt a user whether to terminate or restart the first function process.

10. The terminal according to claim 6, wherein the one or more processors are further configured to call the one or more computer programs stored in the memory to:
　　obtain a call stack of the application process and a call stack of the first function process based on the process call chain, wherein the call stack of the application process and the call stack of the first function process are used to analyze a reason why the terminal does not respond to the first operation on the first user interface of the application.

11. A non-transitory computer storage medium, wherein the non-transitory computer storage medium stores one or more computer programs; and when the one or more computer programs are executed by one or more processors of a terminal, the method according to claim 1 is implemented.

* * * * *

UNITED STATES PATENT AND TRADEMARK OFFICE
CERTIFICATE OF CORRECTION

PATENT NO. : 11,467,894 B2
APPLICATION NO. : 17/285574
DATED : October 11, 2022
INVENTOR(S) : Xinglong Pan et al.

It is certified that error appears in the above-identified patent and that said Letters Patent is hereby corrected as shown below:

In the Claims

In Column 20, Line 42, in Claim 5, after "first" insert -- user --.

In Column 20, Line 50, in Claim 6, after "receive" insert -- a --.

In Column 21, Line 15, in Claim 8, delete "implementing" and insert -- implement --.

Signed and Sealed this
Nineteenth Day of December, 2023

Katherine Kelly Vidal
*Director of the United States Patent and Trademark Office*